US012741278B2

(12) United States Patent
Mawatari et al.

(10) Patent No.: US 12,741,278 B2
(45) Date of Patent: Sep. 22, 2026

(54) CONTAINER FOR CONCENTRATION, CONCENTRATION EQUIPMENT, AND CONCENTRATION METHOD

(71) Applicant: BIOCHROMATO, INC., Kanagawa (JP)

(72) Inventors: Kazuma Mawatari, Tokyo (JP); Kazumasa Kinoshita, Kanagawa (JP); Takao Nishiguchi, Kanagawa (JP); Haruo Shimada, Kanagawa (JP)

(73) Assignee: BIOCHROMATO, INC., Kanagawa (JP)

( * ) Notice: Subject to any disclaimer, the term of this patent is extended or adjusted under 35 U.S.C. 154(b) by 704 days.

(21) Appl. No.: 18/305,629

(22) Filed: Apr. 24, 2023

(65) Prior Publication Data

US 2023/0347336 A1 Nov. 2, 2023

(30) Foreign Application Priority Data

May 2, 2022 (JP) ................................ 2022-076246

(51) Int. Cl.
*B01L 3/00* (2006.01)

(52) U.S. Cl.
CPC ....... *B01L 3/502* (2013.01); *B01L 2200/0631* (2013.01); *B01L 2300/042* (2013.01); *B01L 2300/0681* (2013.01); *B01L 2400/0409* (2013.01); *B01L 2400/0487* (2013.01)

(58) Field of Classification Search
CPC ............. B01L 3/502; B01L 2200/0631; B01L 2300/042; B01L 2300/0681; B01L 2400/0409; B01L 2400/0487; B01L 2300/0858; B01L 3/5082; B01L 3/50; B01L 2200/0689; B01L 2300/048; B01L 2300/0851; G01N 2001/4027; G01N 1/40
See application file for complete search history.

(56) References Cited

U.S. PATENT DOCUMENTS 4,600,473 A 7/1986 Friswell
4,707,452 A * 11/1987 Friswell .................. B01D 1/14 422/547
5,176,799 A * 1/1993 Roe ...................... B01D 5/0063 202/187

(Continued)

FOREIGN PATENT DOCUMENTS

EP 2119497 11/2009
JP S63-502646 10/1988

(Continued)

OTHER PUBLICATIONS

International Search Report mailed on Jan. 11, 2022 with respect to PCT/JP2021/039565.

(Continued)

*Primary Examiner* — Jennifer Wecker
*Assistant Examiner* — Britney N. Washington
(74) *Attorney, Agent, or Firm* — IPUSA, PLLC

(57) ABSTRACT

A container for concentration includes a supplying region in which a swirling flow of a gas is supplied to a solution in the container for concentration, and an avoidance region that is situated below the supplying region and in which supplying of the swirling flow to the solution is avoided.

8 Claims, 15 Drawing Sheets

(56) References Cited

U.S. PATENT DOCUMENTS

| | | | | |
|---|---|---|---|---|
| 2010/0012278 | A1* | 1/2010 | Ohnuki | B01L 3/50825 159/16.1 |
| 2011/0220286 | A1* | 9/2011 | Park | B01F 25/10 137/602 |
| 2023/0347336 | A1 | 11/2023 | Mawatari et al. | |

FOREIGN PATENT DOCUMENTS

| | | |
|---|---|---|
| JP | H09-141135 | 6/1997 |
| JP | 2002-328075 | 11/2002 |
| JP | 4763805 | 8/2011 |
| JP | 2014-104412 | 6/2014 |
| JP | 2014-222148 | 11/2014 |
| JP | 2018-158292 | 10/2018 |
| WO | 2008/078765 | 7/2008 |
| WO | 2013/035755 | 3/2013 |

OTHER PUBLICATIONS

Extended European Search Report mailed on Mar. 2, 2023 with respect to the corresponding European patent application No. 21886241.5.

Office Action mailed on May 3, 2024 issued with respect to the related U.S. Appl. No. 18/000,003.

Office Action mailed on Jan. 20, 2026 issued with respect to the corresponding Japanese Patent Application No. 2022-076246.

* cited by examiner

CONTAINER FOR CONCENTRATION, CONCENTRATION EQUIPMENT, AND CONCENTRATION METHOD

CROSS-REFERENCE TO RELATED APPLICATIONS

This application is based on and claims priority to Japanese Patent Application No. 2022-076246, filed on May 2, 2022, the entire contents of which are incorporated herein by reference.

BACKGROUND OF THE INVENTION

1. Field of the Invention

The present disclosure relates to a container for concentration, concentration equipment, and a concentration method.

2. Description of the Related Art

Analyses targeted at solutions, such as environmental analyses, agricultural chemical analyses, and medical analyses have been widely used. In recent years, greater increase in sensitivity has been required in analyses of solutions, particularly, quantitative determination of concentrations. A conceivable method for increasing sensitivity may be a method of increasing sensitivity of a detection technique. However, it is also effective to increase sensitivity by concentrating solutions, without changing the detection technique.

In this case, a common concentration method is evaporative concentration by boiling. However, this method cannot be applied to target molecules that thermally denature, such as proteins. Meanwhile, Patent Document 1 proposes a method of promoting concentration of a solution by increase in specific interfacial area between the solution and a gas contacting the solution, the increase being obtained by applying a negative pressure to the gas to induce a spiral swirling flow of the gas and thereby form a swirling flow of the liquid. This method can efficiently concentrate the solution even around room temperature, and is promising as a concentration technique suitable for analyses.

RELATED-ART DOCUMENTS

Patent Documents

Patent Document 1: Japanese Patent No. 4763805

SUMMARY OF THE INVENTION

Existing techniques such as one described in Patent Document 1 can efficiently concentrate solutions using a swirling flow, but have room for improvement in terms of performing quantitative concentration, which is critical for analyses.

It is an object of the present disclosure to provide a container for concentration, concentration equipment, and a concentration method that enable accurate quantitative concentration of a solution.

A container for concentration according to an embodiment of the present disclosure is a container for concentration, in which a solution is concentrated, and includes a supplying region in which a swirling flow of a gas is supplied to the solution in the container for concentration, and an avoidance region that is situated below the supplying region and in which supplying of the swirling flow to the solution is avoided.

According to the present disclosure, it is possible to provide a container for concentration, concentration equipment, and a concentration method that enable accurate quantitative concentration of a solution.

DESCRIPTION OF THE EMBODIMENTS

Figure 1:
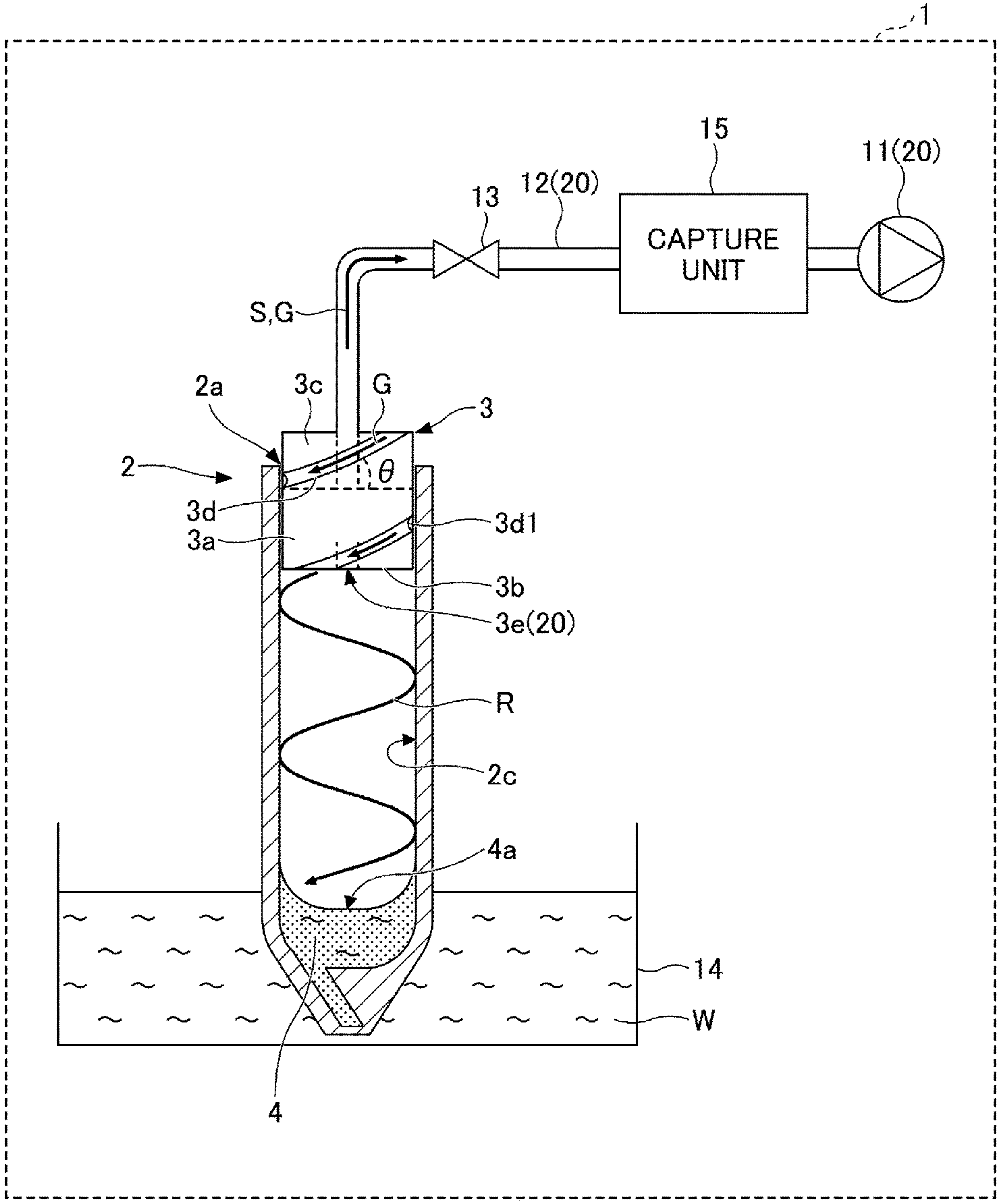
FIG. 1 is an exemplary view illustrating an overall configuration of concentration equipment according to a first embodiment.

Embodiments will be described below with reference to the attached drawings. For facilitating understanding, the same components in the drawings will be denoted by the same reference numerals wherever possible, and redundant descriptions about such components will be skipped.

First Embodiment

The first embodiment will be described with reference to FIG. 1 to FIG. 6.

<Configuration of Concentration Equipment>

FIG. 1 is an exemplary view illustrating an overall configuration of concentration equipment 1 according to the first embodiment.

The concentration equipment 1 is an example of equipment configured to separate a gaseous substance (solvent) S from a solution 4 in which the gaseous substance S is dissolved, to quantitatively concentrate the solution 4, i.e., the analyzing-target sample, to a given concentration. The concentration equipment 1 can also function as equipment configured to capture the gaseous substance S separated from the solution 4.

Examples of the gaseous substance S that can be removed from the solution 4 using the concentration equipment 1 include solvents used in, for example, ordinary organochemical (organic synthesis and purification) experiments, and solid substances having a vapor pressure. Specific examples of the gaseous substance S include volatile substances such as methanol, ethanol, acetonitrile, water, and dimethyl sulfoxide (DMSO), and carbonic acid and oxygen.

The concentration equipment 1 includes a container 2 (container for concentration) in which the solution 4 is contained, a cock 3 configured to close an upper opening 2*a* of the container 2, a depressurization unit 11 configured to depressurize the interior of the container 2, a capture unit 15 configured to capture the gaseous substance S, and a duct 12.

The depressurization unit 11 is, for example, an air pump for gas release. The duct 12 is coupled to the depressurization unit 11, and the capture unit 15 is installed halfway on the duct 12. The capture unit 15 need not be installed, and, for example, may be omitted when no trouble occurs when a separated gaseous substance is released to the atmosphere. An end of the duct 12 is inserted into a through-hole 3*e* in the cock 3. A valve 13 may be installed at an appropriate location of the duct 12. By adjusting the opening degree of the valve 13, it is possible to adjust the quantity of a suctioning gas.

The container 2 is a centrifuge tube or a like container formed of, for example, glass or plastics. The container 2 is a container for concentration used for concentrating the solution 4 to be contained inside.

The solution 4 is contained inside the container 2. For example, the container 2 is supported by an unillustrated supporting member such that the bottom portion of the container 2 is soaked in water in a water tank 14. Heating the water W in the water tank 14 promotes vaporization and separation of the gaseous substance S such as a volatile substance from the solution 4. In the example of FIG. 1, the container 2 is immersed in the water tank 14. Instead of immersing the container 2 in the water tank 14, it is possible to use a bead bath that is densely packed with aluminum beads, or to heat the container 2 by blowing the container 2 with hot air. Moreover, heating is not indispensable depending on the kind of the solution 4 containing the gaseous substance S or the outside air temperature.

When installed on the concentration equipment 1 by, for example, the unillustrated supporting member, the container 2 has a shape having a longer dimension in the upward or downward direction (the direction toward the top or the bottom of FIG. 1) and having at the upper end, the upper opening 2*a* through which the solution 4 is fed into the container. A cross-sectional shape of the container 2 orthogonal to the longer dimension of the container 2 is, for example, a circular shape, but may be any other shape such as a polygonal shape.

In the following description, the upper opening 2*a* side of the container 2 when the container 2 is installed on the concentration equipment 1 may be referred to as the upper side, and the opposite side may be referred to as the lower side.

The cock 3 is formed to conform to the shape of an internal peripheral surface 2*c* of the container 2 near the upper opening 2*a* such that the cock 3 closes the upper opening 2*a* of the container 2. In the example of FIG. 1, the portion of the container 2 near the upper opening 2*a* has an approximately cylindrical shape. Hence, the cock 3 is formed in an approximately cylindrical shape having approximately the same diameter as the inner diameter of the upper opening 2*a*. Grooves 3*d* through which a gas is introduced into the container are formed in a spiral shape in a side surface 3*a* of a circular columnar shape constituting the cock 3. The through-hole 3*e* is formed in the cock 3 from the center of a lower end surface 3*b* and the center of an upper end surface 3*c* of the circular columnar shape of the cock 3.

The material of the cock 3 is not particularly limited, yet a material that remains stable even in contact with the solution 4 is preferable. For example, fluorine-based rubbers or fluorine-based resins such as polytetrafluoroethylene (PTFE) are preferable. Other than the fluorine-based materials, for example, commodity rubbers such as silicone rubber, polyisobutylene rubber, acrylic rubber, styrene-butadiene rubber, butadiene rubber, isoprene rubber, and chloroprene rubber, or thermoplastic elastomers such as polyethylene elastomer and polyisobutylene elastomer may be used depending on the kind of the solution.

The grooves 3*d* are formed of a plurality of inclined grooves that extend from the upper end surface 3*c* to the lower end surface 3*b* and through which a gas is introduced. The grooves 3*d* are formed in the side surface 3*a* of the cock 3 and inclined at a predetermined angle with respect to the upper end surface 3*c* and the lower end surface 3*b*. The inclination angle θ of the grooves 3*d* is preferably from 10° through 45°, and more preferably from 15° through 25° in terms of increasing efficiency of separation by the grooves 3*d* while increasing the flow rate of the gas to be introduced into the container 2. The grooves 3*d* are an example of gas introducing grooves.

A gas G introduced through the grooves 3*d* is preferably air. When an atmosphere of an inert gas (e.g., a nitrogen gas or an argon gas) is necessary for separation of a gaseous substance from the solution 4 depending on the kind of the gaseous substance, at least the entirety of the container 2 into which the cock 3 is inserted may be put under the inert gas atmosphere. In the example of FIG. 1, the grooves 3*d* have a shape that heads from the upper end surface 3*c* toward the lower end surface 3*b* and extends in the clockwise direction when seen from above the cock 3, but may have a shape extending in the counterclockwise direction.

It is preferable that the number of grooves 3*d* be a plural number. When there is only one groove, the gas flow to be taken in may be taken in nonuniformly, and the liquid surface may not become stable depending on the gas flow rate. The number of grooves is preferably from 2 through 10. If the number of grooves is two, a preferable interval is 180°. If the number of grooves is three, a preferable interval is 120°. Whichever of four, five, and ten the number of grooves is, it is preferable to arrange the gas grooves at equal intervals.

The depth and width of the grooves 3*d* are appropriately set in accordance with the dimensions of the cock 3. The cross-sectional area of the grooves 3*d* is preferably from 0.4% through 10% of the cross-sectional area of the cock 3, and more preferably from 1.6% through 3.5% of the cross-sectional area of the cock 3. If the cross-sectional area of the grooves 3*d* is less than 0.4% of the cross-sectional area of the cock 3, the solution 4 blown upward by a swirling flow R of the gas G taken in through the grooves 3*d* may reach the upper portion of the container 2 and enter the duct 12. On the other hand, if the cross-sectional area of the grooves 3*d* is greater than 10% of the cross-sectional area of the cock 3, the swirling flow R of the gas G taken in through the grooves 3*d* only touches the upper portion of the solution 4 and stirs only the upper portion of the solution 4, which may result in an insufficient effect of promoting vaporization of the gaseous substance S.

It is preferable that the plurality of grooves 3*d* have the same cross-sectional area. If they have different cross-sectional areas, it is preferable to alternate grooves having larger cross-sectional areas and grooves having smaller cross-sectional areas when the number of grooves is even. For example, if the number of grooves is six, providing three grooves with larger cross-sectional areas and providing the remaining three grooves with smaller cross-sectional areas enables stable separation.

It is preferable to form the grooves 3*d* in the side surface 3*a* of the cock 3 spirally from the upper end surface 3*c* toward the lower end surface 3*b* of the cock 3.

The side surface 3*a* contacts the internal peripheral surface 2*c* of the container 2 illustrated in FIG. 1, by its region extending from the upper end surface 3*c* to the lower end surface 3*b*. That is, the cock 3 is formed such that the entirety of its side surface 3*a*, except the grooves 3*d*, contacts the internal peripheral surface 2*c* of the container 2. Hence, there is a space 3*d*1 between the grooves 3*d* and the internal peripheral surface 2*c* of the container 2. The space 3*d*1 leads from the upper end surface 3*c* to the lower end surface 3*b* of the cock 3 and forms a path through which the gas G is introduced. Accordingly, the gas G introduced into the grooves 3*d* from the upper end surface 3*c* of the cock 3 is guided to the lower end surface 3*b* of the cock 3 without being diffused to portions other than the grooves 3*d* (the portions being between the side surface 3*a* of the cock 3 and the internal peripheral surface 2*c* of the container 2), to become a swirling flow R conforming to the spiral shape of the grooves 3*d* and blow the solution 4.

The through-hole 3*e* is an ejection hole through which the gaseous substance S separated from the solution 4 is ejected together with the gas G introduced into the container 2 through the grooves 3*d*. The through-hole 3*e* is formed between the center of the lower end surface 3*b* and the center of the upper end surface 3*c*.

It is preferable that the cross-sectional area of the through-hole 3*e* be equal to or larger than the total cross-sectional area of the plurality of grooves.

When the gas G is taken in from the side surface 3*a* of the cock 3 to the surface of the solution (a liquid surface 4*a* of the solution 4) in the form of a swirling flow R, the entirety of the solution 4 is driven to a rotation movement by the swirling flow R of the gas G. As a result of the rotation movement of the solution 4, an ascending force of the liquid surface 4*a* acts on the internal peripheral surface 2*c* of the container 2 because of a centrifugal force working in the solution 4. However, a force heading top-downward acts because of the swirling flow R of the gas G, and an effect of reducing the air pressure near the center of the liquid surface 4*a* acts because the gas G is suctioned through the through-hole 3*e* formed in the center of the cock 3. Hence, the balance among these factors reduces the likelihood of significant fluctuations of the liquid surface 4*a* even if the gas G of a substantial quantity is taken in.

Figure 2:
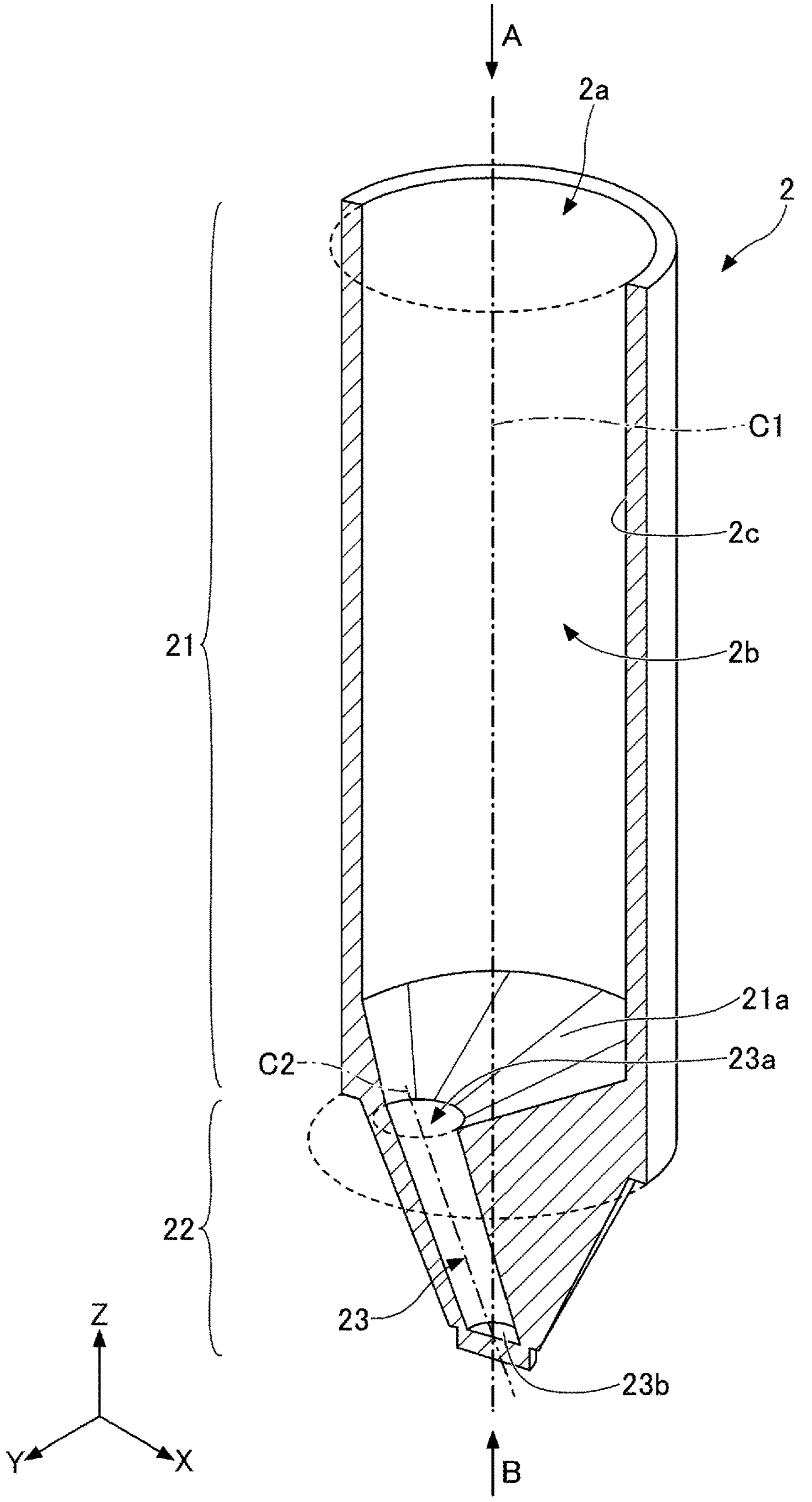
FIG. 2 is an oblique cross-sectional view of a container for concentration according to an embodiment.
Figure 3:
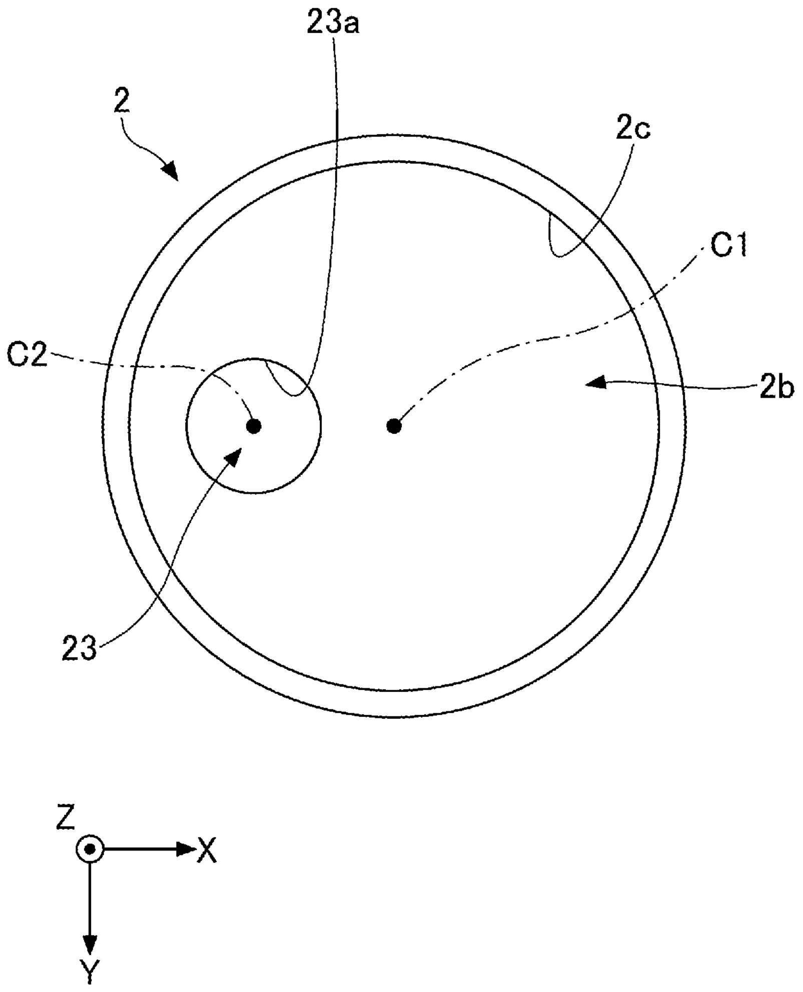
FIG. 3 is an arrow view of a container seen from above (in a direction of an arrow A of FIG. 2).
Figure 4:
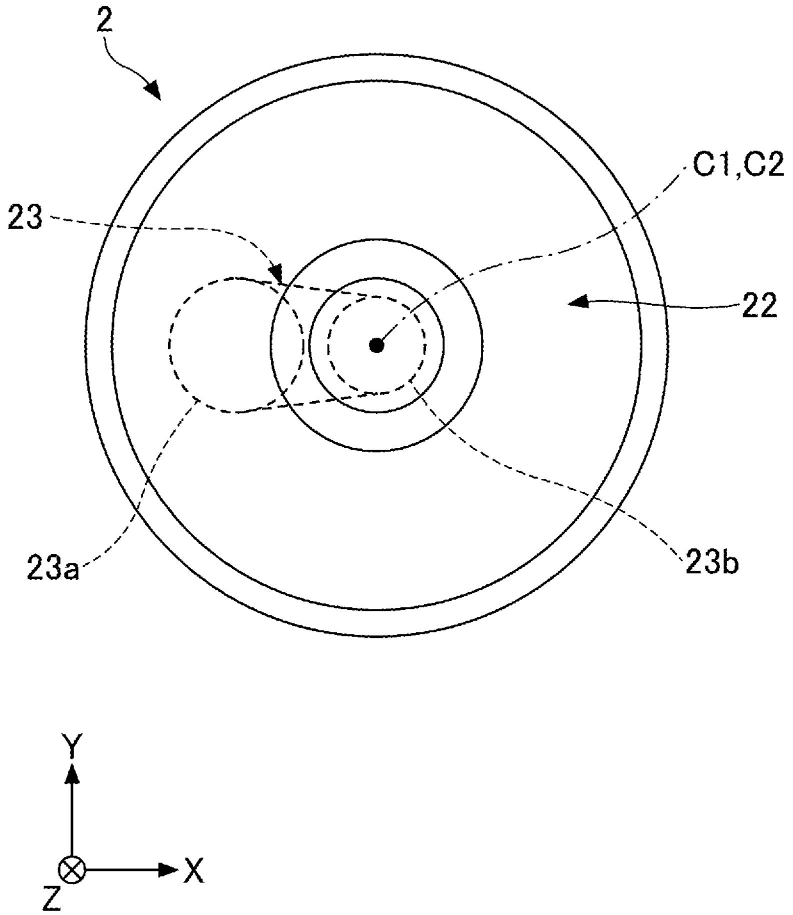
FIG. 4 is an arrow view of a container seen from below (in a direction of an arrow B of FIG. 2).

FIG. 2 is an oblique cross-sectional view of the container 2 for concentration according to an embodiment. FIG. 3 is an arrow view of the container 2 seen from above (in a direction of an arrow A of FIG. 2). FIG. 4 is an arrow view of the container 2 seen from below (in a direction of an arrow B of FIG. 2). The cross-sectional view of FIG. 2 is a longitudinal cross-sectional view of a cross-section taken along a plane including a central axis C1 of the container 2 in the longer direction.

FIG. 2 to FIG. 4 indicate x, y, and z three axial directions in order to clarify the correspondence between the drawings. The x direction, the y direction, and the z direction are directions perpendicular to one another. The z direction corresponds to the upward or downward direction mentioned above. The positive direction in the Z direction is the upward direction. The x direction and the y direction are typically horizontal directions. The x direction is the direction in which a central axis C2 of a narrow tube 23 described below is inclined.

As illustrated in FIG. 2, the container 2 for concentration according to the present embodiment includes a supplying region 21 and an avoidance region 22.

The supplying region 21 is a portion in which the swirling flow R of the gas G is supplied to the solution 4 in the container 2 for concentration. The supplying region 21 includes an internal space 2*b* existing inside the container 2 for concentration and extending in the upward or downward direction when the container 2 is installed on the concentration equipment 1, and the supplying region 21 is formed such that the swirling flow R is supplied from the upper portion of the internal space 2*b*. For example, the internal space 2*b* of the supplying region 21 is formed in a circular hole shape having a constant diameter along the central axis C1.

The internal space 2*b* of the supplying region 21 need not necessarily have a shape of which the inner diameter is constant, but may have a shape of which the inner diameter is reduced from the upper opening 2*a* side toward the lower portion of the container 2 as in a tapered shape, so long as the upper portion of the container can be sealed with the cock 3 having a shape that is capable of closely fitting the inner diameter of the tapered shape. Being capable of closely fitting the inner diameter means having air tightness of a degree that the gas G substantially does not flow into or flow out from the internal space 2*b* via the side surface 3*a* of the cock 3, except through the gas introducing grooves 3*d* formed in the side surface 3*a* of the cock 3.

The avoidance region 22 is a portion that is situated below the supplying region 21 when the container 2 is installed on the concentration equipment 1, and in which supplying of the swirling flow R to the solution 4 is avoided. The avoidance region 22 includes a narrow tube 23 (minute tube) that is continuous with a lower end portion 21*a* of the internal space 2*b* of the supplying region 21 and has a diameter smaller than that of the supplying region 21.

As illustrated in FIG. 2 and FIG. 3, the position of an upper end opening 23*a* of the narrow tube 23 is offset from the central axis C1 of the supplying region 21. For example, in the example of FIG. 3, the position of the central axis C2 of the upper end opening 23*a* is offset from the central axis C1 of the internal space 2*b* by approximately 4 mm in the radial direction, when the inner diameter of the internal space 2*b* of the supplying region 21 is assumed to be 14.90 mm.

As illustrated in FIG. 2, the lower end portion 21*a* of the supplying region 21 is formed in an earthenware mortar-like shape, of which the lowest position in the upward or downward direction is the position at which the upper end opening 23*a* of the narrow tube 23 is located.

In the present embodiment, the narrow tube 23 is a hole extending along the central axis C2 and having a bottom surface at a lower end portion 23*b*. For example, the narrow tube 23 is formed in a circular hole shape along the central axis C2 the same as the supplying region 21 is. Moreover, in the present embodiment, the narrow tube 23 is formed such that the lower end portion 23*b* is disposed on the central axis C1 of the supplying region 21 (i.e., the central axis C2 is disposed to cross the central axis C1 at the lower end portion 23*b*), and the direction in which the central axis C2 extends is inclined with respect to the upward or downward direction (i.e., the direction in which the central axis C1 extends).

For example, in such an example as described above in which the inner diameter of the internal space 2*b* of the supplying region 21 is approximately 15 mm, the inner diameter of the upper end opening 23*a* of the narrow tube 23 is approximately 4 mm, and the inner diameter of the lower end portion 23*b* of the narrow tube 23 is approximately 3 mm. The depth of the narrow tube 23 along the central axis C2 is approximately 11 mm.

The diameter of the narrow tube 23 is preferably 5 mm or less. The volume of the internal space 2*b* of the container 2 is preferably of a degree enough to secure space that allows injection of the solution 4 of approximately 5 ml into the internal space 2*b* together with the narrow tube 23, and that allows sufficient stirring of the solution 4 by the swirling flow R of the gas G introduced into the container 2. As described below in the third embodiment, when using the narrow tube 23 as the discharging hole of a pipette and when discharging a concentrated solution 4 of a minute quantity, it is possible to minutely adjust the discharging quantity by using a minute tube having an inner diameter of 2 mm or less as the narrow tube 23.

<Procedure for Solution Concentration>

Figure 5C:
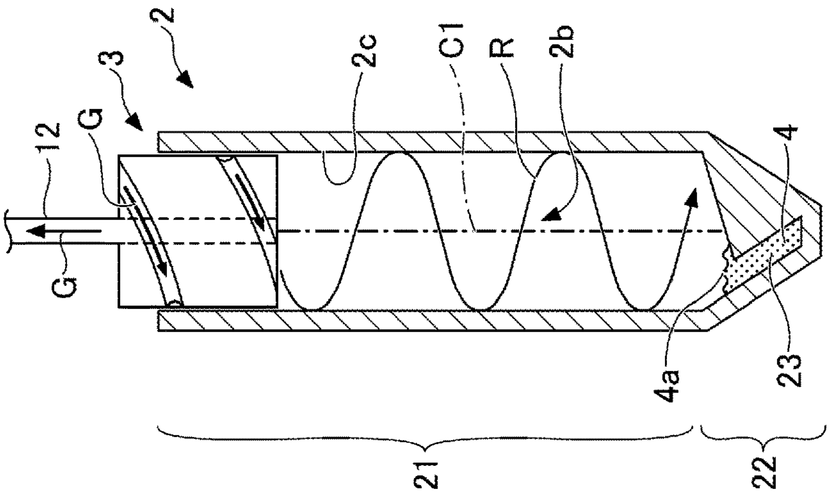
FIG. 5C is an exemplary view illustrating a changing state of a solution during operation of concentration equipment.
Figure 5B:
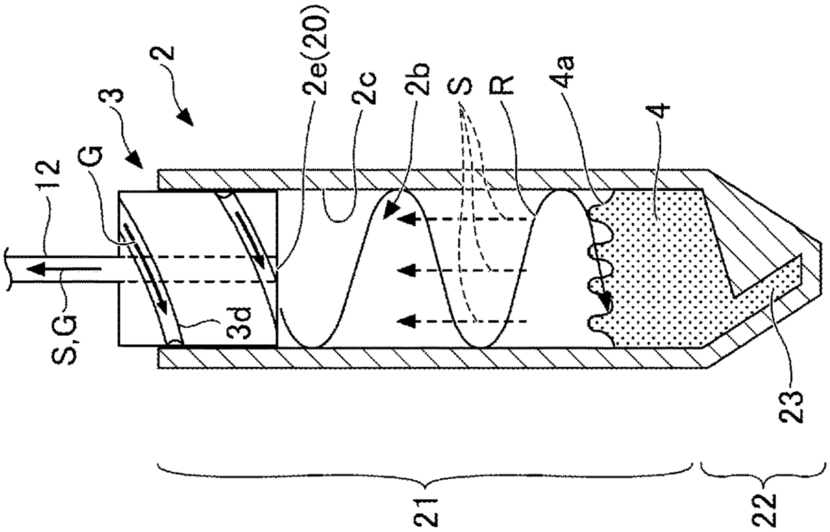
FIG. 5B is an exemplary view illustrating a changing state of a solution during operation of concentration equipment.
Figure 5A:
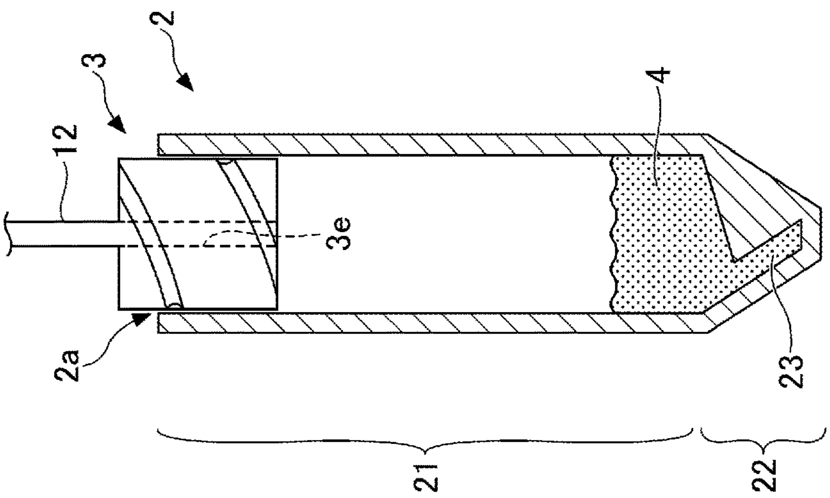
FIG. 5A is an exemplary view illustrating a changing state of a solution during operation of concentration equipment.

Next, the operation of the concentration equipment 1 will be described with reference to FIG. 5A to FIG. 5C. FIG. 5A to FIG. 5C are exemplary views illustrating changing states of the solution 4 during operation of the concentration equipment 1. Each of FIG. 5A to FIG. 5C is a longitudinal cross-sectional view taken along a plane including the central axis C1 of the container 2 in the longer direction.

First, as illustrated in FIG. 5A, the solution 4 is injected into the container 2 up to a height that is within in the supplying region 21 (injection step). Then, with the duct 12, which leads out from the depressurization unit 11, inserted into the through-hole 3*e* of the cock 3, the cock 3 is inserted into the container 2 through the upper opening 2*a*, to seal the solution 4 in the container 2.

Next, the depressurization unit 11 is actuated. Here, when the configuration includes the valve 13 that is installed on the duct 12 as illustrated in FIG. 1, the duct 12 is made continuous with the through-hole 3*e* in a state where the valve 13 is open. This effects depressurization in the container 2, intake of the gas G present at the side of the upper end surface 3*c* of the cock 3 into the grooves 3*d*, and high-speed taking-in of the gas G into the internal space 2*b* (supplying region 21) of the container 2 through the grooves 3*d* (supplying step).

For example, the gas G taken in at a high speed becomes a swirling flow R (cyclone flow) while spirally swirling along the internal peripheral surface 2*c* of the container 2, and reaches the liquid surface 4*a* of the solution 4. As a result, the solution 4 is whipped up and stirred by the swirling flow R, to promote vaporization of the gaseous substance S (solvent). That is, the solution 4 in the container 2 is concentrated (concentration step). Here, the solution 4 is also accumulated inside the narrow tube 23 in the avoidance region 22. However, because the effects of the swirling flow R are not transmitted to the solution 4 inside the narrow tube 23, the solution inside the narrow tube lags behind in being concentrated. Moreover, here, because the solution 4 is stirred by the effects of the swirling flow R, the liquid surface 4*a* ripples and does not remain stable.

The gaseous substance S vaporized from the solution 4 is ejected outside the container 2 through the through-hole 3*e* and the duct 12 together with part of the gas G introduced into the container 2 (ejection step). Here, the capture unit 15 may capture the ejected gaseous substance S.

That is, in the present embodiment, the depressurization unit 11, the through-hole 3*e* of the cock 3, the duct 12, and the valve 13 function as an ejection unit 20 configured to eject the solvent (gaseous substance S), which has vaporized from the solution 4 by the effects of the swirling flow R, from inside the container 2. FIG. 5B corresponds to the concentration step including: the supplying step of ejecting the gas G present in the container 2 by means of the ejection unit 20 and supplying the swirling flow R to the solution 4 in the container 2 through the grooves 3*d*; and the ejection step of ejecting the solvent vaporized from the solution 4 by the effects of the swirling flow R from inside the container 2 by means of the ejection unit 20. In another configuration, the concentration equipment 1 may be free of the valve 13. In such a case, the depressurization unit 11, the through-hole 3*e* of the cock 3, and the duct 12 function as the ejection unit 20.

By the process of FIG. 5B being continued, the gaseous substance S vaporized from the solution 4 is gradually ejected outside the container 2. As a result, the concentration of the solution 4 in the container 2 gradually increases, and the liquid surface 4*a* gradually falls toward the avoidance region 22 side. Then, as illustrated in FIG. 5C, the liquid surface 4*a* of the solution 4 falls to near the narrow tube 23, e.g., to a height of the earthenware mortar-like portion at the lower end portion 21*a* of the supplying region 21 and above the upper end opening 23*a* of the narrow tube 23.

Meanwhile, as concentration of the solution 4 outside the narrow tube 23 proceeds, a specific gravity difference occurs between the solution 4 outside the narrow tube 23 and the solution 4 inside the narrow tube 23. Hence, the solution 4 inside the narrow tube 23 is gradually replaced with the concentrated solution 4. Moreover, the concentration of the solution 4 inside the narrow tube 23 increases by the diffusion effect attributable to the concentration difference between inside the narrow tube 23 and outside the narrow tube 23.

Because the swirling flow R of the gas G spirally swirls about the central axis C1 of the container 2 along the internal peripheral surface 2*c* of the container 2 as described above, the effects of the swirling flow R are minimized within the narrow tube 23, which is offset from the central axis C1 and has a diameter smaller than that of the internal space 2*b* of the supplying region 21. Hence, once the liquid surface 4*a* has fallen to near the narrow tube 23 as illustrated in FIG. 5C, the liquid surface 4_a_ of the solution 4 becomes stable because it is less likely that the solution 4 accumulated inside the narrow tube 23 is affected by the effects of the swirling flow R, even if the gas G continues to be introduced into the container 2. In the state of FIG. 5C, the solvent is not vaporized even if the gas G is introduced into the container 2, and only the introduced gas G is ejected through the duct 12.

When the liquid surface 4_a_ of the solution 4 has fallen to near the narrow tube 23 as illustrated in FIG. 5C as described, the liquid surface 4_a_ becomes stable and it becomes easier to visually observe the position of the liquid surface 4_a_. Hence, the user of the concentration equipment 1 can more accurately ascertain the quantity of the solution 4 after being concentrated and having fallen to a predetermined height near the narrow tube 23. Moreover, for example, by comparing the quantity of the solution 4 injected into the container 2 before actuation of the concentration equipment 1 with the quantity of the solution 4 after being concentrated and having fallen to a predetermined height inside the narrow tube 23, it is easy to confirm that the concentration reached a desired concentration.

By taking more time and further proceeding with the concentration process from the state of FIG. 5C, it is possible to lower the liquid surface 4_a_ of the solution 4 to a position inside the narrow tube 23. In this case, depletion of the solution 4 from the supplying region 21 is sensed. Hence, it is possible to further increase the concentration magnification of the solution 4.

Then, after the solution 4 is concentrated to a desired concentration, the depressurization unit 11 is stopped, to stop supplying of the gas G into the container 2, and the operation of the concentration equipment 1 is terminated (stopping step). Subsequently, the concentrated solution 4 in the container 2 is extracted from the container 2 (extraction step). The concentrated liquid (i.e., the solution 4 after being concentrated) can be extracted through the upper opening 2_a_ of the container 2 using, for example, a dropper.

Next, the workings and effects of the first embodiment will be described. The container 2 for concentration according to the first embodiment includes the supplying region 21 in which the swirling flow R of the gas G is supplied to the solution 4 in the container 2 for concentration, and the avoidance region 22 that is situated below the supplying region 21 and in which supplying of the swirling flow R to the solution 4 is avoided.

The concentration equipment 1 according to the first embodiment includes the container 2 described above, the cock 3 configured to close the upper opening 2_a_ of the container 2, the grooves 3_d_ formed in the side surface 3_a_ of the cock 3 in a spiral shape and configured to introduce the gas G into the container 2, and the ejection unit 20 configured to eject the solvent (gaseous substance S) vaporized from the solution 4 by the effects of the swirling flow R from inside the container 2.

This configuration can reduce the likelihood that the solution 4 is affected by the effects of the swirling flow R after the solution 4 injected into the container 2 has been concentrated until the height of the liquid surface 4_a_ has fallen to near the avoidance region 22 as illustrated in FIG. 5C. Hence, even if the swirling flow R is being supplied into the container 2 continuously, it is possible to inhibit rippling of the liquid surface 4_a_ of the solution 4 and stabilize the liquid surface 4_a_. As a result, it becomes easier for the user of the concentration equipment 1 to visually observe the position of the liquid surface 4_a_. Hence, it possible to ascertain the degree of concentration of the solution 4 easily and more accurately. As a result, according to the first embodiment, it is possible to perform quantitative concentration of the solution 4 with a good accuracy.

In the container 2 for concentration according to the first embodiment, the supplying region 21 is formed such that the swirling flow R is supplied from the upper portion of the container 2 for concentration. The avoidance region 22 includes the narrow tube 23 that is continuous with the lower end portion 21_a_ of the supplying region 21 and that has a diameter smaller than that of the supplying region 21.

This configuration enables accumulation of the solution 4 in the narrow tube 23 having a small diameter, after the solution 4 is concentrated to a smaller quantity having a higher concentration. This can magnify changes of the liquid surface 4_a_ with respect to volume reduction of the solution 4 along with concentration of the solution 4. This makes it even easier to keep track of changes in the degree of concentration of the solution 4.

In the container 2 for concentration according to the first embodiment, the position of the upper end opening 23_a_ of the narrow tube 23 in the avoidance region 22 is offset from the central axis C1 of the supplying region 21.

This configuration enables the position of the upper end opening 23_a_ of the narrow tube 23 to be deviated from the center of rotation of the swirling flow R introduced into the container 2 (or from the central axis C1 of the supplying region 21). This makes it possible to more securely avoid the swirling flow R being supplied to the solution 4 inside the narrow tube 23 (or avoid the effect of the swirling flow R).

In the container 2 for concentration according to the first embodiment, the narrow tube 23 is formed such that the direction in which the narrow tube 23 extends is inclined with respect to the upward or downward direction, by the lower end portion 23_b_ being disposed on the central axis C1 of the supplying region 21.

In general, it is often the case that the containers used for analyses of solutions are Spitz tubes having a conical-shaped acute bottom. In the present embodiment, by forming the narrow tube 23 in the avoidance region 22 such that the narrow tube 23 is inclined toward the central axis C1, it is possible to make provision of the avoidance region 22 inside the container 2 result in a shape similar to an existing Spitz tube. This makes it possible to handle the container 2 for concentration in the same manner as handling an existing Spitz tube, and to improve versatility of the container 2 so that it is possible to use, for example, an analyzing instrument for an existing Spitz tube as is for the container 2. Moreover, inclining the extending direction of the narrow tube 23 can increase the depth of the narrow tube 23 with respect to the dimension of the avoidance region 22 in the upward or downward direction. This makes it possible to increase the quantity of the solution 4 after being concentrated, which can be accumulated in the narrow tube 23, and to improve versatility of the container 2 also in this respect.

In the container 2 for concentration according to the first embodiment, the lower end portion 21_a_ of the supplying region 21 is formed in an earthenware mortar-like shape, of which the lowest position in the upward or downward direction is the position at which the upper end opening 23_a_ of the narrow tube 23 is located.

This configuration makes it easier for the solution 4, which is gradually decreasing in volume, to flow toward the upper end opening 23_a_ of the narrow tube 23 from the lower end portion 21_a_ of the supplying region 21 in the concentration process of the solution 4 by the concentration equipment 1. This can ensure a more secure guidance of the solution 4 into the narrow tube 23, and can shorten the time needed for ultimate stabilization of the liquid surface 4*a* inside the narrow tube 23, i.e., concentration of the solution 4 to a predetermined quantity.

The concentrated liquid (i.e., the solution 4 after being concentrated) can be extracted through the upper opening 2*a* of the container 2 using, for example, a dropper.

<Result of Experiment>

Next, the result of an experiment using the concentration equipment 1 according to the present embodiment will be described. As the solution 4, a sunset yellow (edible dye) aqueous solution (having a 488-nm absorbance of 0.8) was used. The quantity of the solution to be introduced into the container 2 was 1.0 ml. For evaluation of the concentration, an absorptiometer (using a peak wavelength value of 488 nm) was used. The shape and dimensions of the container 2 were the same as those described with reference to FIG. 2 to FIG. 4.

The container 2 into which the sunset yellow aqueous solution (1 ml) was injected and sealed with the cock 3 was set on the concentration equipment 1, and the concentration equipment 1 was actuated for approximately 1 hour in a room temperature environment. As a result, the sunset yellow aqueous solution was concentrated until the liquid surface fallen to a height inside the narrow tube 23 of the container 2. When the liquid surface became stable at a desired height, the operation of the concentration equipment 1 was stopped. Ultimately, the solution was concentrated to 47 μl (0.047 ml).

Subsequently, the quantity of the solution after being concentrated was increased to 1,547 μl (1.547 ml) by dilution, and the absorbance of the resulting product was measured, to calculate the concentration magnification. For calculation of the concentration magnification, the mathematical formula below was used.

$$\text{Concentration magnification} = \text{absorbance after concentration} \times \text{volume after quantity increase} / \text{volume before quantity increase (dilution ratio)} \div \text{absorbance before concentration}$$

$$= 0.36 \times 1547/47 \div 0.8$$

$$= 15$$

Hence, it was indicated by the result of the experiment described above that use of the concentration equipment 1 according to the present embodiment made it possible to concentrate the analyzing-target solution to a desired concentration easily also in terms of visual observation by the user of the concentration equipment 1, and with a good accuracy, and to perform quantitative concentration of the solution easily with a good accuracy.

MODIFIED EXAMPLES

Next, a modified example of the first embodiment will be described with reference to FIG. 6 to FIG. 8. The narrow tube 23 provided in the avoidance region 22 need at least be continuous with the lower end portion of the supplying region 21 and have a diameter smaller than that of the supplying region 21, and is not limited to the shape illustrated in FIG. 1 to FIG. 5C.

Figure 6:
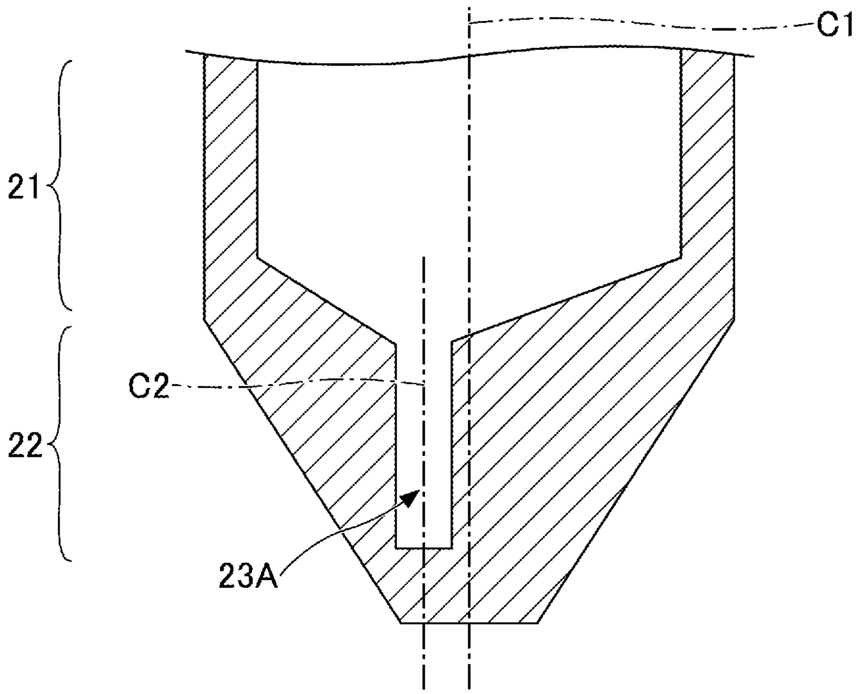
FIG. 6 is a view illustrating a shape of a narrow tube according to a first modified example of the first embodiment.

FIG. 6 is a view illustrating the shape of a narrow tube 23A according to a first modified example of the first embodiment. FIG. 6 is a longitudinal cross-sectional view of the container 2 corresponding to FIG. 5A to FIG. 5C, and only illustrates the lower portion of the container 2 including the avoidance region 22. For example, as the narrow tube 23A illustrated in FIG. 6, the extending direction of the narrow tube 23A, i.e., the central axis C2 need not be in an oblique direction, but may be parallel with the central axis C1 of the supplying region 21 while being distanced from the central axis C1.

Figure 7A:
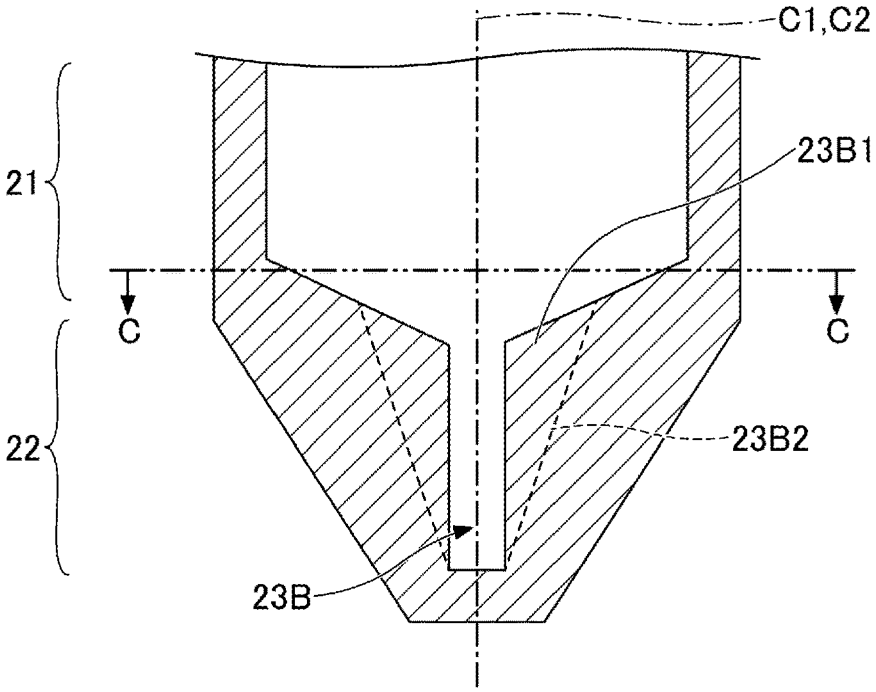
FIG. 7A is a view illustrating a shape of a narrow tube according to a second modified example of the first embodiment.
Figure 7B:
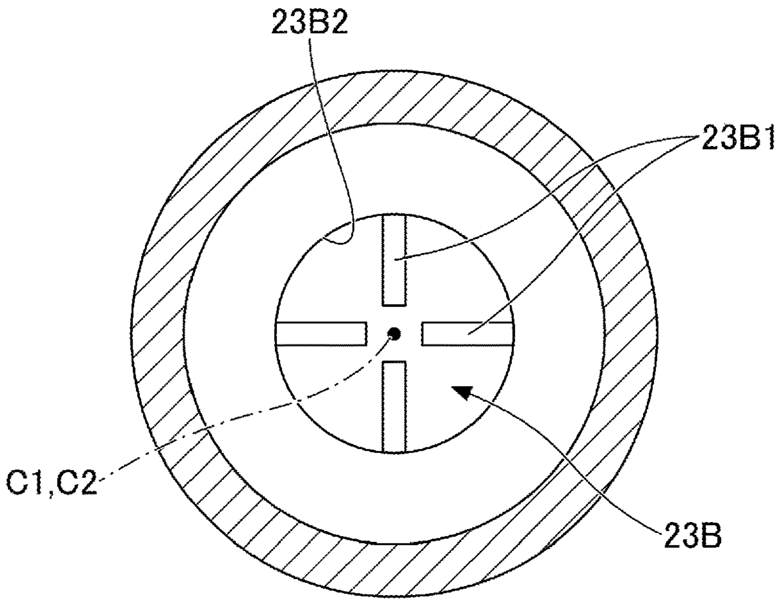
FIG. 7B is a view illustrating a shape of a narrow tube according to the second modified example of the first embodiment.

FIG. 7A and FIG. 7B are views illustrating the shape of a narrow tube 23B according to a second modified example of the first embodiment. FIG. 7A is a longitudinal cross-sectional view of the container 2 corresponding to FIG. 5A to FIG. 5C, and only illustrates the lower portion of the container 2 including the avoidance region 22. FIG. 7B is a cross-sectional view of FIG. 7A taken from C to C, and is a top view of the narrow tube 23B.

When the central axis C2 of the narrow tube 23B is coaxial with the central axis C1 of the supplying region 21 as in the narrow tube 23*b* illustrated in FIG. 7A and FIG. 7B, the swirling flow R has its effects even around the axis. However, in the example of FIG. 7A and FIG. 7B, baffle board members 23B1 configured to offset the swirling flow R are provided on a surrounding wall 23B2 around the narrow tube 23B. For example, a plurality of baffle board members 23B1 are arranged at approximately uniform intervals along the peripheral direction of the surrounding wall 23B2 around the narrow tube 23B as illustrated in FIG. 7B (four at every approximately 90-degree angular position in the example of FIG. 7B), and are formed such that the longer dimension of each is along the central axis C2 and each projects toward the central axis C2 as illustrated in FIG. 7A. With such baffle board members 23B1, a portion of the swirling flow R inside the narrow tube 23B collides against the baffle board members 23B1, and a portion of the portion of the swirling flow R that collides against the baffle board members 23B1 becomes a reverse flow. As a result, it is possible to avoid any swirling flow R inside the narrow tube 23B.

Figure 8:
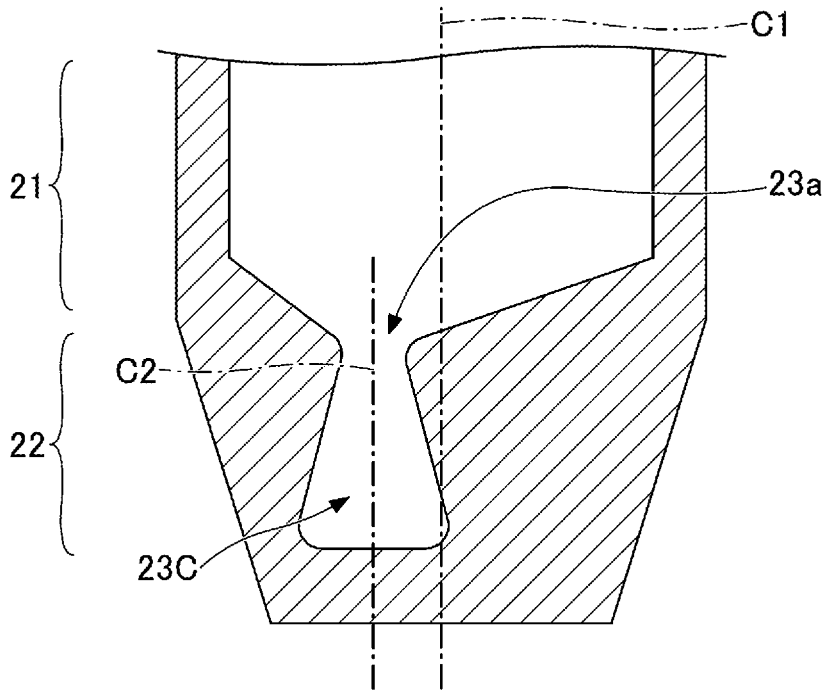
FIG. 8 is a view illustrating a shape of a narrow tube according to a third modified example of the first embodiment.

FIG. 8 is a view illustrating the shape of a narrow tube 23C according to a third modified example of the first embodiment. FIG. 8 is a longitudinal cross-sectional view of the container 2 corresponding to FIG. 5A to FIG. 5C, and only illustrates the lower portion of the container 2 including the avoidance region 22. As in the narrow tube 23C illustrated in FIG. 8, the diameter of the narrow tube 23C may increase downward, instead of being uniform in the direction of the central axis C2. This configuration featuring a narrow upper end opening 23*a* can also inhibit entry of the swirling flow R into the narrow tube 23C.

Second Embodiment

A second embodiment will be described with reference to FIG. 9A to FIG. 11. FIG. 9A to FIG. 11 are exemplary views illustrating first to third examples of the container 2A for concentration according to the second embodiment, and do not illustrate part of the upper portion of the supplying region 21.

As illustrated in FIG. 9A to FIG. 11, in the container 2A according to the second embodiment, the diameter of the avoidance region 22 is the same as that of the supplying region 21, and the central axis of the avoidance region 22 is coaxial with the central axis C1 of the supplying region 21. Accordingly, without any other feature, entry of the swirling flow R into the avoidance region 22 cannot be prohibited. Hence, the container 2A according to the second embodiment includes a blocking member 24 configured to block entry of the swirling flow R into the avoidance region 22, instead of the narrow tube 23 of the first embodiment. FIG. 9A to FIG. 11 illustrate three examples of the shape of the blocking member 24.

Figure 9A:
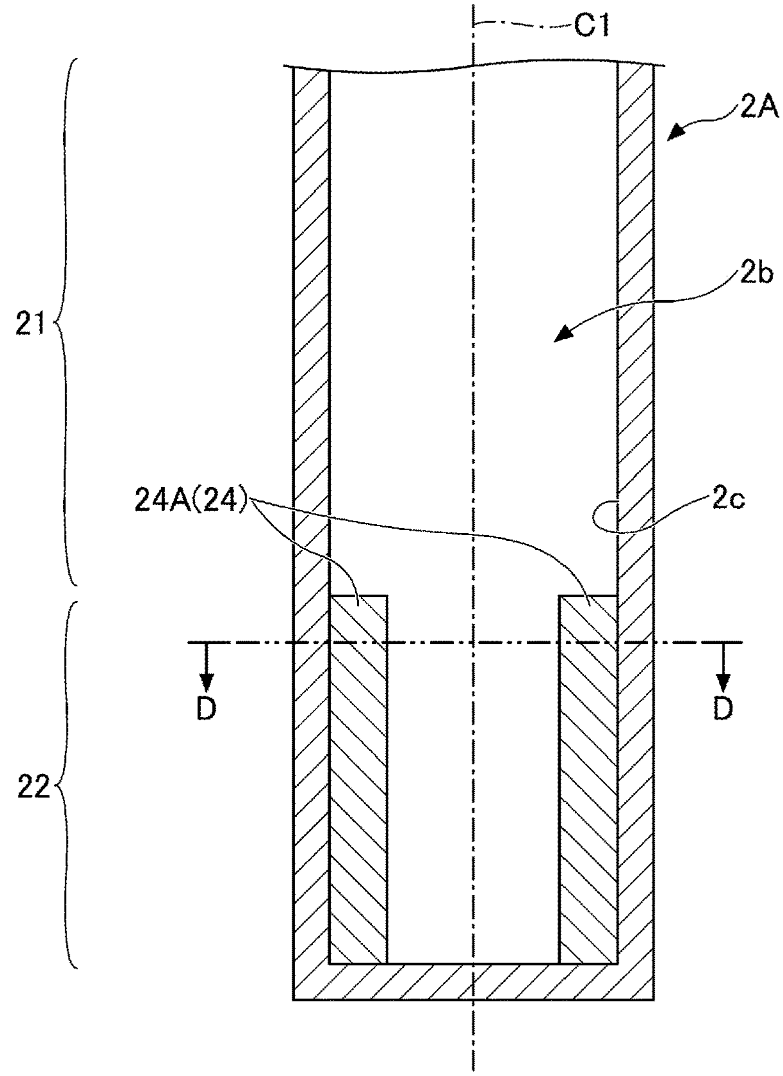
FIG. 9A is an exemplary view illustrating a first example of a container for concentration according to a second embodiment.
Figure 9B:
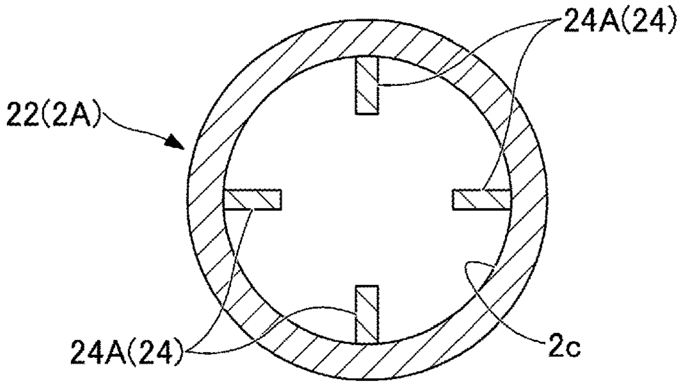
FIG. 9B is an exemplary view illustrating a first example of a container for concentration according to the second embodiment.

FIG. 9A is a longitudinal cross-sectional view of the container 2A corresponding to FIG. 5A to FIG. 5C. FIG. 9B is a cross-sectional view of FIG. 9A taken from D to D, and is a top view of the avoidance region 22. For example, as in the first example illustrated in FIG. 9A and FIG. 9B, as the blocking member 24, baffle board members 24A configured to offset the swirling flow R are provided on the internal peripheral surface 2*c* of the avoidance region 22.

A plurality of baffle board members 24A are arranged at approximately uniform intervals along the peripheral direction of the internal peripheral surface 2*c* of the avoidance region 22 as illustrated in FIG. 9B (four at every approximately 90-degree angular position in the example of FIG. 9B), and are formed such that the longer dimension of each is along the central axis C1 and each projects toward the central axis C1 as illustrated in FIG. 9A. With such baffle board members 24A, a portion of the swirling flow R in the avoidance region 22 collides against the baffle board members 24A, and a portion of the portion of the swirling flow R that collides against the baffle board members 24A becomes a reverse flow. As a result, it is possible to avoid any swirling flow R in the avoidance region 22.

Figure 10A:
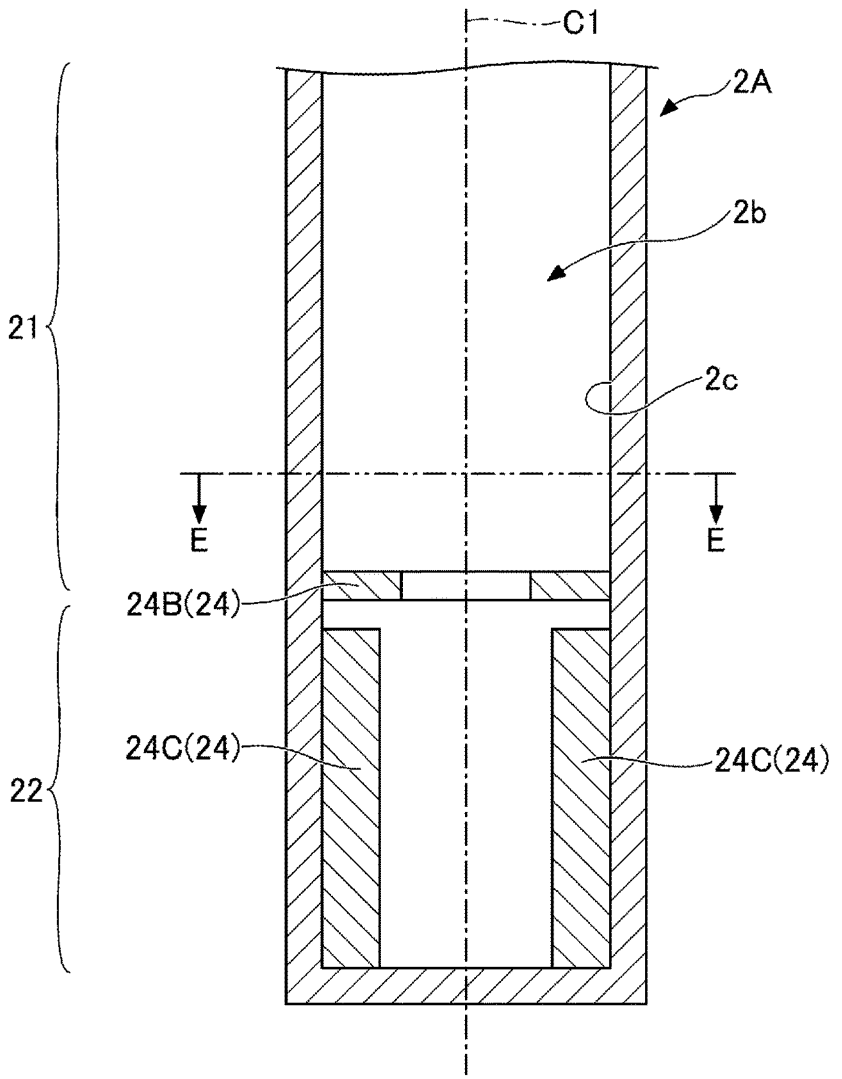
FIG. 10A is an exemplary view illustrating a second example of a container for concentration according to the second embodiment.
Figure 10B:
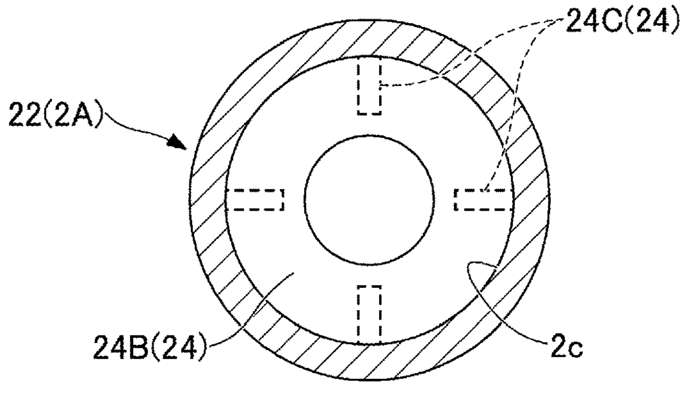
FIG. 10B is an exemplary view illustrating the second example of a container for concentration according to the second embodiment.

FIG. 10A is a longitudinal cross-sectional view of the container 2A corresponding to FIG. 5A to FIG. 5C. FIG. 10B is a cross-sectional view of FIG. 10A taken from E to E, and is a top view of the avoidance region 22. As in the second example illustrated in FIG. 10A and FIG. 10B, as the blocking member 24, a horizontal baffle board member 24B having an annular shape and projecting from the internal peripheral surface 2*c* toward the central axis C1 is provided at the boundary between the supplying region 21 and the avoidance region 22 in the internal space 2*b* of the container 2A. Moreover, as the blocking member 24, vertical baffle board members 24C configured to offset the swirling flow R are provided on the internal peripheral surface 2*c* of the avoidance region 22. The horizontal baffle board member 24B need not extend annularly along the peripheral direction of the internal peripheral surface 2*c*, but a plurality of board members may be arranged discontinuously at predetermined intervals. The vertical baffle board members 24C have a shape similar to the baffle board members 24A of the first example illustrated in FIG. 9A and FIG. 9B.

With such a horizontal baffle board member 24B and vertical baffle board members 24C, a portion of the swirling flow R flowing in the supplying region 21 collides against the horizontal baffle board member 24B first, and a portion of the portion of the swirling flow R that collides against the horizontal baffle board member 24B is blocked from entering the avoidance region 22. Moreover, a portion of the swirling flow R that enters the avoidance region 22 collides against the vertical baffle board members 24C, and a portion of the portion of the swirling flow R that collides against the vertical baffle board members 24C becomes a reverse flow. As a result, it is possible to avoid any swirling flow R in the avoidance region 22.

Figure 11:
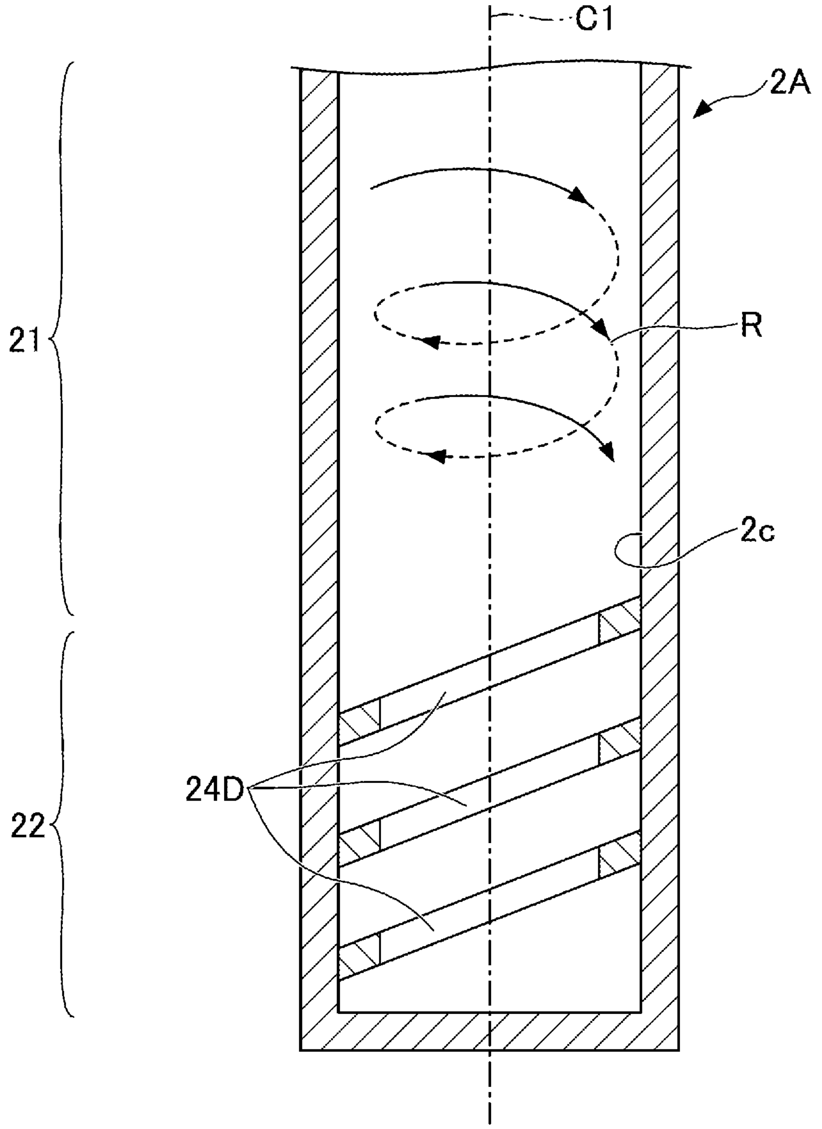
FIG. 11 is an exemplary view illustrating third example of a container for concentration according to the second embodiment.

FIG. 11 is a longitudinal cross-sectional view of the container 2A corresponding to FIG. 5A to FIG. 5C. As in the third example illustrated in FIG. 11, as the blocking member 24, a streak portion 24D formed in a spiral shape heading in an opposite direction to the swirling direction of the swirling flow R may be provided on the internal peripheral surface 2*c* of the avoidance region 22. In the example of FIG. 11, when the container 2A is seen from above, the swirling direction of the swirling flow R is the clockwise direction, whereas the streak portion 24D is formed in the anticlockwise direction top downwards. The streak portion 24D is formed to project from the internal peripheral surface 2*c* toward the central axis C1, and is formed such that its longer dimension extends in a spiral shape along the peripheral direction of the internal peripheral surface 2*c*.

With such a streak portion 24D, the swirling flow R that enters the avoidance region 22 collides against the streak portion 24D and is blocked from swirling. As a result, it is possible to avoid any swirling flow R in the avoidance region 22.

As described, the container 2A for concentration according to the second embodiment includes the blocking member 24 configured to block entry of the swirling flow R into the avoidance region 22. This configuration can also reduce the likelihood that the solution 4 is affected by the effects of the swirling flow R after the solution 4 injected into the container 2A has been concentrated until the height of the liquid surface 4*a* has fallen into the range of the avoidance region 22. Hence, it is possible to inhibit rippling of the liquid surface 4*a* of the solution 4 and to stabilize the liquid surface 4*a*. Accordingly, it is possible to perform quantitative concentration of the solution 4 with a good accuracy as in the first embodiment.

The examples of FIG. 9A to FIG. 11 illustrate configurations in which the diameter of the avoidance region 22 is the same as that of the supplying region 21. However, the blocking member 24 may be provided to a configuration in which the diameter of the avoidance region 22 is smaller than that of the supplying region 21 as in the first embodiment.

Third Embodiment

Figure 12:
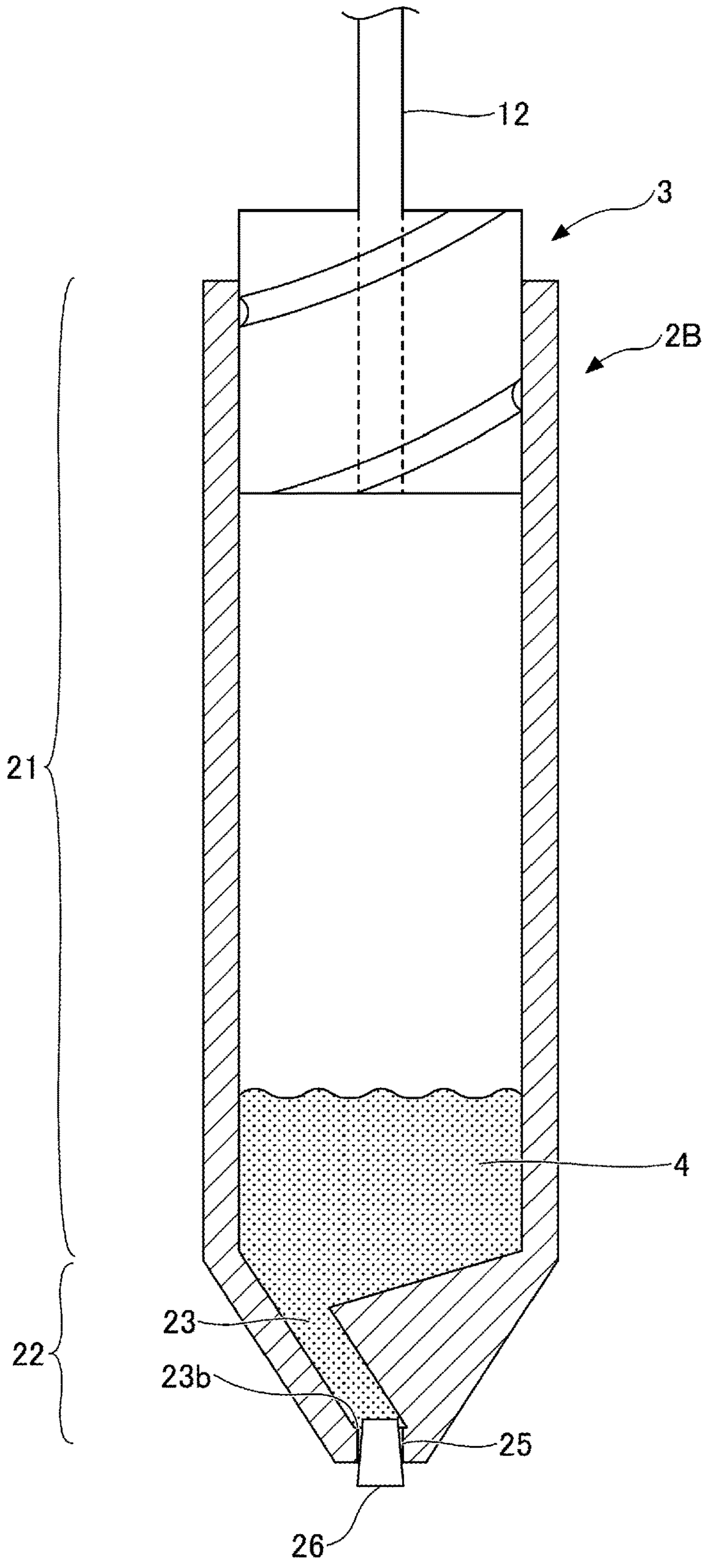
FIG. 12 is an exemplary view illustrating an example of a container for concentration according to a third embodiment.

The third embodiment will be described with reference to FIG. 12 and FIG. 13. FIG. 12 is an exemplary view illustrating an example of a container 2B for concentration according to the third embodiment.

As illustrated in FIG. 12, the container 2B according to the third embodiment includes an opening portion 25 provided at the lower end portion 23*b* of the narrow tube 23 in the avoidance region 22, and a sealing member 26 configured to seal the opening portion 25, in addition to the components of the container 2 according to the first embodiment.

As illustrated in FIG. 12, during operation of the concentration equipment 1, the opening portion 25 is sealed with the sealing member 26. Hence, the solution 4 can be accumulated in the container 2B as can be in the container 2 according to the first embodiment, and a concentration process by the concentration equipment 1 can be performed in the same manner as when the container 2 according to the first embodiment is used.

Figure 13:
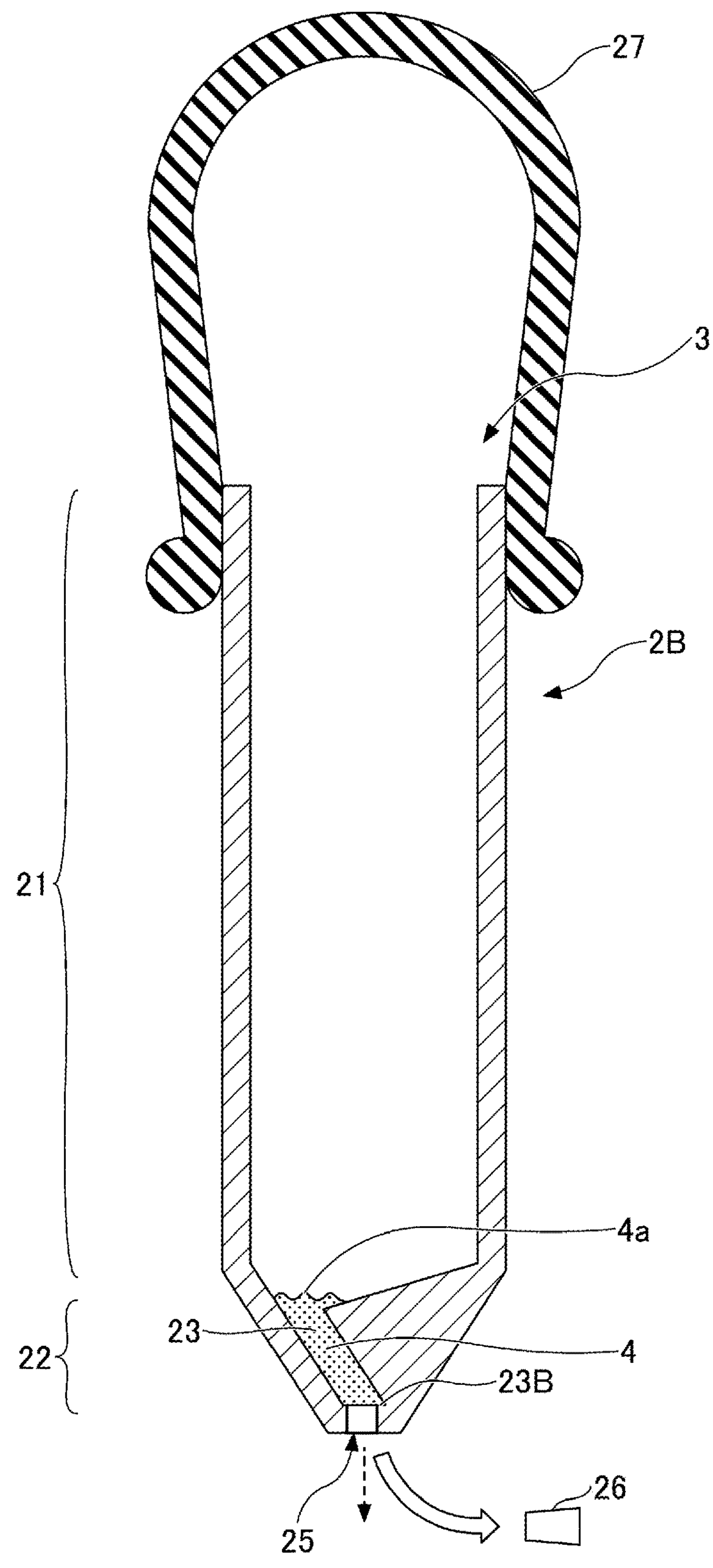
FIG. 13 is an exemplary view illustrating an example of a procedure for pouring out a solution after being concentrated in a container for concentration according to the third embodiment.

FIG. 13 is an exemplary view illustrating an example of a procedure for pouring out the solution 4 after being concentrated in the container 2B for concentration according to the third embodiment. As illustrated in FIG. 13, by removing the sealing member 26 from the container 2B for concentration after concentrating the solution 4 using the concentration equipment 1, it is possible to pour out the solution 4 after being concentrated, which is accumulated inside the narrow tube 23 in the avoidance region 22, from the opening portion 25 at the lower end of the container 2.

As the method for extracting the solution 4, a conceivable method is to, for example, use the container 2 as if it were a pipette or a dropper, by attaching a balloon-like object 27 made of rubber, such as one that is used on a dropper, on the upper opening 2*a* of the container 2 as illustrated in FIG. 13, and depressing the balloon-like object 27. The procedure for this operation may be as follows. First, after a concentration operation, the cock 3 is removed from the container 2, the container 2 is demounted from the concentration equipment 1, and the balloon-like object 27 made of rubber is attached at the upper opening 2*a* of the container 2 instead of the cock 3. Next, the sealing member 26 is removed from the container 2 with the container 2 laid horizontally, and the container 2 is conveyed to, for example, a predetermined analyzing instrument with care taken so that the concentrated liquid does not drip out from the opening portion 25 due to gravity. Then, at the analyzing instrument, the balloon-like object 27 made of rubber is squeezed, to drop a necessary quantity from the opening portion 25.

As a result, the solution 4 after being concentrated, which is accumulated inside the narrow tube 23, is pushed from above and poured outside through the opening portion 25 at the lower portion.

As described, the container 2B for concentration according to the third embodiment includes the opening portion 25 provided at the lower end portion 23*b* of the avoidance region 22, and the sealing member 26 configured to seal the opening portion 25. While the solution 4 is being concentrated, the opening portion 25 is sealed by the sealing member 26, and the sealing member 26 is removed from the container 2B after concentration of the solution 4. As a result, it is possible to pour out the solution 4 after being concentrated, which is accumulated in the avoidance region 22, from the opening portion 25.

This configuration enables direct extraction of the solution 4 after being concentrated, from the narrow tube 23 in the avoidance region 22. Hence, after a concentration process using the concentration equipment 1, it is possible to divert the container 2B for concentration as a pipette. Accordingly, it is possible to improve versatility and convenience of the container 2B for concentration, and to perform an analysis of the solution 4 more efficiently. A small openable/closable valve may optionally be provided on the sealing member 26, and the concentrated liquid may be extracted from the narrow tube 23 by opening of the valve.

Fourth Embodiment

The fourth embodiment will be described with reference to FIG. 14 and FIG. 15.

Figure 14:
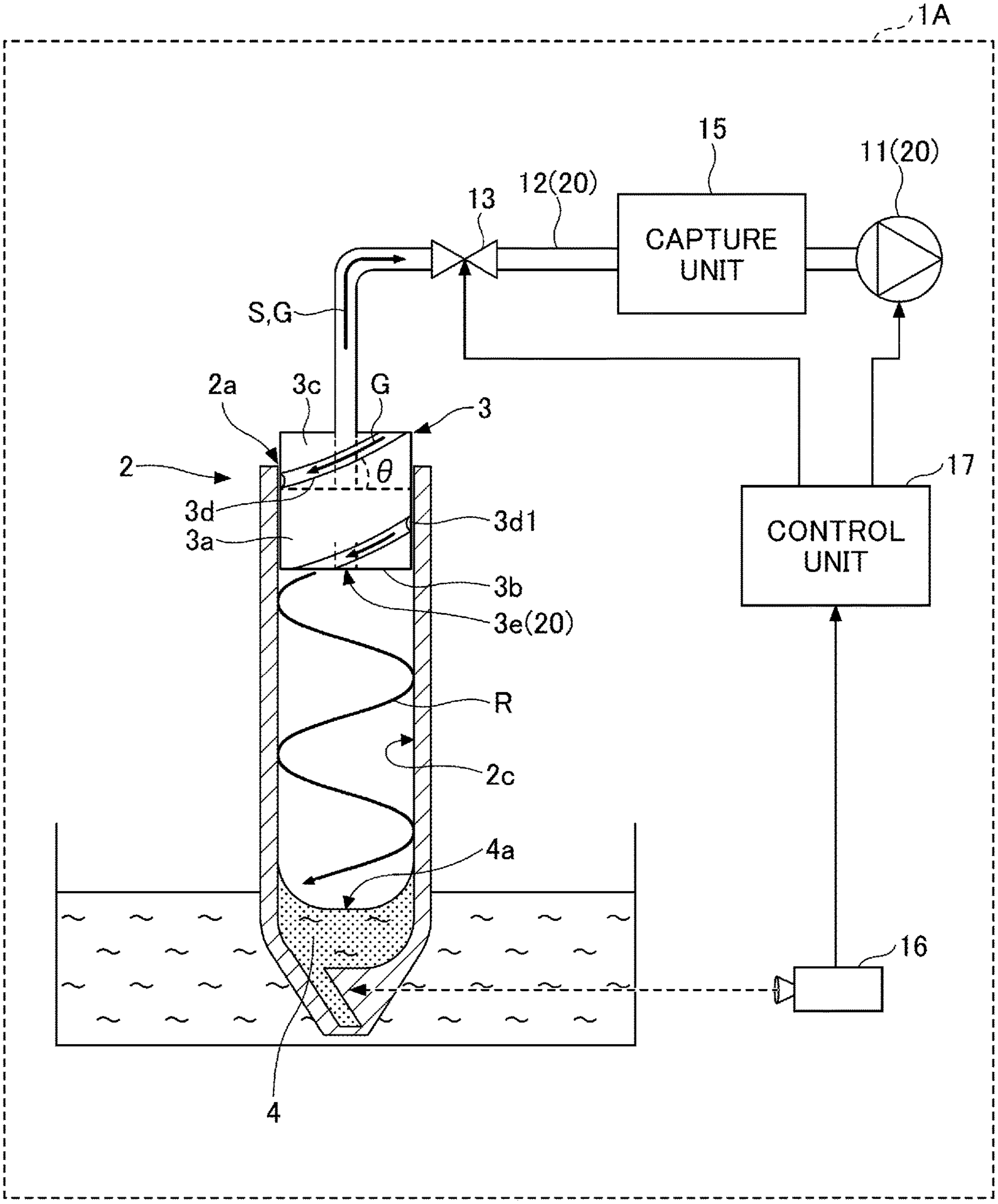
FIG. 14 is an exemplary view illustrating an overall configuration of concentration equipment according to a fourth embodiment.
Figure 15:
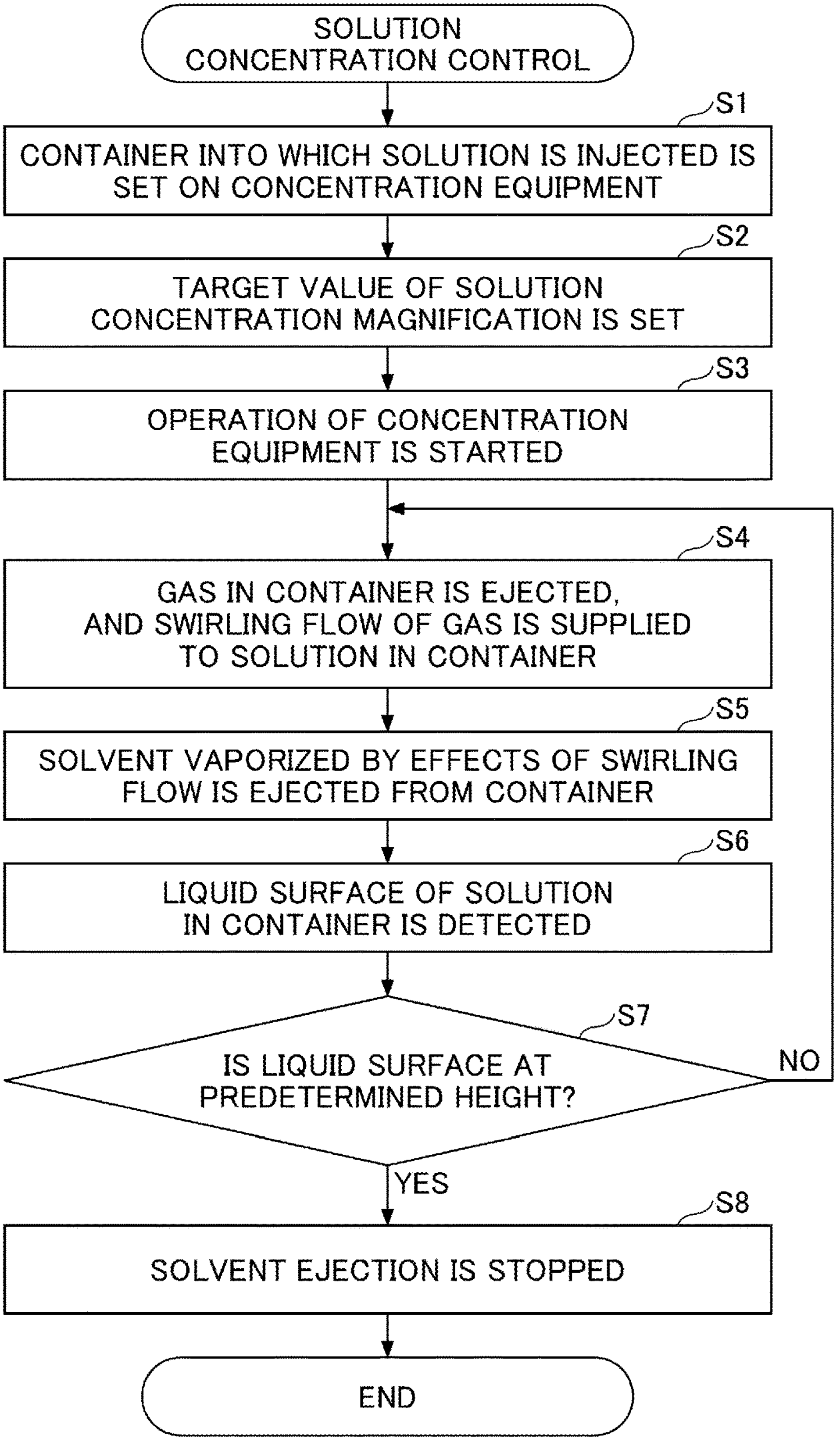
FIG. 15 is a flowchart for solution concentration control according to the fourth embodiment.

FIG. 14 is an exemplary view illustrating the overall configuration of concentration equipment 1A according to the fourth embodiment. As illustrated in FIG. 14, the concentration equipment 1A according to the fourth embodiment further includes a detection unit 16 and a control unit 17 in addition to the components of the concentration equipment 1 according to the first embodiment.

The detection unit 16 is configured to detect the liquid surface 4*a* of the solution 4 in the container 2. An any desirably selected component that can acquire information that enables determination of the position of the liquid surface 4*a* in the container 2, such as a camera configured to capture a moving image or a still image, can be applied as the detection unit 16.

The control unit 17 is configured to control ejection of the solvent (gaseous substance S) from the container 2 by the ejection unit 20 (depressurization unit 11, duct 12, through-hole 3*e*, and valve 13). For example, the control unit 17 controls the solvent ejection operation by the ejection unit 20 by controlling opening or closing of the valve 13, or controlling the turning on or off of the depressurization unit 11. Hence, in the present embodiment, the depressurization unit 11 and the valve 13 are configured to be operable on, for example, a drive source in accordance with an operation instruction from the control unit 17.

The control unit 17 controls the ejection unit 20 to stop ejection of the solvent from the container 2, when the detection unit 16 detects that the liquid surface 4*a* has fallen to a predetermined height in the container 2. For example, the control unit 17 can control ejection of the solvent to stop, by controlling the operation of the depressurization unit 11 in a manner to cause the depressurization unit 11 to stop operating, or controlling the operation of the valve 13 on the duct 12 in a manner to cause the valve 13 to close.

By means of the control unit 17, the concentration equipment 1A according to the fourth embodiment can automatically control the process of concentrating the solution 4 to a desired concentration.

The operation of the concentration equipment 1A according to the fourth embodiment will be described with reference to FIG. 15. FIG. 15 is a flowchart according to which concentration of the solution 4 is controlled according to the fourth embodiment.

In the step S1, the solution 4 is injected into the container 2 up to a height that is within in the supplying region 21, and the container 2 into which the solution 4 is injected is set on the concentration equipment 1 (injection step).

In the step S2, the control unit 17 sets a target value for the concentration magnification of the solution 4. The control unit 17 acquires the target value in response to, for example, an operation input given by the user of the concentration equipment 1. The target value for the concentration magnification includes information indicating, for example, a predetermined height position of the liquid surface 4*a* inside the narrow tube 23 in the avoidance region 22, or a predetermined height position of the liquid surface 4*a* near the upper end opening 23*a* of the narrow tube 23 (the predetermined height position near the upper end opening 23*a* being, for example, the earthenware mortar-like portion at the lower end portion 21*a* of the supplying region 21 and above the upper end opening 23*a*). In another possible configuration, in response to input of information indicating the quantity of the solution 4 injected into the container 2 and information indicating the target value of the concentration magnification, the control unit 17 may calculate a height position of the liquid surface 4*a* in the container 2 based on these kinds of information such that the height position will match the target value.

In the step S3, the control unit 17 controls the ejection unit 20 of the concentration equipment 1 to start operating. For example, the control unit 17 opens the valve 13 and actuates the depressurization unit 11.

In the step S4, in response to the start of actuation of the ejection unit 20, any gas present in the container 2 is ejected outside the container 2 through the through-hole 3*e* of the cock 3 and the duct 12. As a result, the interior of the container 2 is depressurized, and the gas G is Introduced into the container 2 through the grooves 3*d* of the cock 3. The gas G is introduced into the container 2 in the form of a swirling flow R along the spiral shape of the grooves 3*d*, and the swirling flow R of the gas G is supplied to the solution 4 in the container 2 (supplying step).

In the step S5, the solvent (gaseous substance S) vaporized by the effects of the swirling flow R is ejected from inside the container 2 by means of the ejection unit 20 (ejection step). The supplying step S4 and the ejection step S5 are performed substantially at the same time. These steps S4 and S5 may be organized as one step, i.e., as a concentration step of concentrating the solution 4 in the container 2.

In the step S6, the detection unit 16 detects the height position of the liquid surface 4*a* of the solution 4 in the container 2 while the step S4 (supplying step) and the step S5 (ejection step) are being performed (detection step). The detection unit 16 outputs information indicating the detected height position to the control unit 17. It is possible to detect the height position by visual observation, by, for example, reducing the quantity of gas ejection and weakening the strength of the swirling flow R, to thereby relatively reduce the height of the waves of the liquid surface 4*a*.

In the step S7, the control unit 17 determines whether or not the position of the liquid surface 4*a*, which is the target of detection by the detection unit 16 in the step S6, has fallen to the predetermined height in the container 2 matching the target value in the step S2. When the liquid surface 4*a* of the solution 4 is not at the predetermined height (No in the step S7), the flow returns to the step S4, and the processes of the steps S4 to S6 are repeated.

On the other hand, when the liquid surface 4*a* of the solution 4 has reached the predetermined height (Yes in the step S7), which means that the solution 4 in the container 2 has been concentrated to the desired concentration, the flow goes to the step S8, in which the control unit 17 controls the ejection unit 20 to stop operating, to stop ejection of the solvent from the container 2 (stopping step). The control unit 17 can stop ejection of the solvent by, for example, controlling the operation of the depressurization unit 11 in a manner to cause the depressurization unit 11 to stop operating, or controlling the operation of the valve 13 on the duct 12 in a manner to cause the valve 13 to close.

Subsequently, the concentrated solution 4 in the container 2 is extracted from the container 2 (extraction step). The concentrated liquid (solution 4 after being concentrated) may be extracted through the upper opening 2*a* of the container 2, using, for example, a dropper. The flow of the control finishes after the process of the step S8.

Hence, the concentration equipment 1A according to the fourth embodiment includes the control unit 17 configured to control ejection of the solvent (gaseous substance S) from the container 2 by the ejection unit 20, and the detection unit 16 configured to detect the liquid surface 4*a* of the solution 4 in the container 2. The control unit 17 stops ejection of the solvent from the container 2 by the ejection unit 20 when the detection unit 16 detects that the liquid surface 4*a* has fallen to a predetermined height in the container 2.

According to this configuration, the control unit 17 can automatically control the process of concentrating the solution 4 to a desired concentration. Hence, it is possible to improve operability and convenience of the concentration equipment 1A. Moreover, it is possible to detect the degree to which the solution 4 is concentrated with a higher accuracy than the accuracy of visual observation of the liquid surface 4*a* by the user. Hence, it is possible to concentrate the solution 4 to a desired concentration with a higher accuracy.

Physically, the control unit 17 of the concentration equipment 1A can be configured as a computer system including, for example, a Central Processing Unit (CPU), a Graphics Processing Unit (GPU), a Random Access Memory (RAM) and a Read Only Memory (ROM), which are main memory devices, an input device such as a keyboard and a mouse serving as input devices, an output device such as a display, a communication module serving as a data exchange device such as a network card, and an auxiliary memory device such as a hard disk. Each function of the control unit 17 described above is realized by predetermined computer software being read into the hardware such as the CPU and the RAM, to thereby cause the communication module, the input device, and the output device to operate under control of the CPU, and to cause data to be read out from or written into the RAM or the auxiliary memory device.

The present embodiment has been described above with reference to the specific examples. However, the present disclosure is not limited to these specific examples. Any appropriate design modifications that may be made unto these specific examples by persons skilled in the art are included within the scope of the present disclosure, so long as such modifications include the features of the present disclosure. The components included in each specific example described above, and, for example, dispositions, conditions, and shapes of the components are not limited to the examples presented, and can be appropriately modified. Combination of the components included in each specific example described above can be appropriately changed so long as no technical inconsistency occurs.

The containers 2, 2A, and 2B for concentration according to the embodiments described above may also be applied to equipment other than the concentration equipment 1 and 1A.

What is claimed is:

1. A container for concentration in which a solution is concentrated, the container comprising:

a supplying region in which a swirling flow of a gas is supplied to the solution in the container for concentration; and an avoidance region that is situated below the supplying region and in which supplying of the swirling flow to the solution is avoided, wherein the supplying region is formed such that the swirling flow is supplied from an upper portion of the container for concentration, the avoidance region includes a narrow tube that is continuous with a lower end portion of the supplying region and that has a diameter smaller than a diameter of the supplying region, a position of an upper end opening of the narrow tube is offset from a central axis of the supplying region, and the narrow tube is formed such that a lower end portion of the narrow tube is disposed on the central axis of the supplying region and a direction in which the narrow tube extends is inclined with respect to an upward or downward direction.

2. The container for concentration according to claim 1, wherein the lower end portion of the supplying region is formed in an earthenware mortar-like shape, of which a lowest position in the upward or downward direction is the position at which the upper end opening of the narrow tube is located.

3. The container for concentration according to claim 1, further comprising:

an opening portion provided at a lower end portion of the avoidance region; and a sealing member configured to seal the opening portion, wherein while the solution is being concentrated, the opening portion is sealed by the sealing member, and the sealing member is removed from the container for concentration after concentration of the solution, to enable the solution after being concentrated and accumulated in the avoidance region, to be poured out from the opening portion.

4. The container for concentration according to claim 1, further comprising:

a blocking member configured to block entry of the swirling flow into the avoidance region.

5. Concentration equipment configured to concentrate a solution, the concentration equipment comprising:

a container in which the solution is contained, the container including a supplying region in which a swirling flow of a gas is supplied to the solution, and an avoidance region that is situated below the supplying region when the container is installed on the concentration equipment and in which supplying of the swirling flow to the solution is avoided;

a cock configured to close an upper opening of the container;

a groove formed in a side surface of the cock in a spiral shape, and configured to introduce the gas into the container; and an ejection unit configured to eject a solvent, which is vaporized from the solution by effects of the swirling flow, from inside the container, wherein the supplying region is formed such that the swirling flow is supplied from an upper portion of the container for concentration, the avoidance region includes a narrow tube that is continuous with a lower end portion of the supplying region and that has a diameter smaller than a diameter of the supplying region, a position of an upper end opening of the narrow tube is offset from a central axis of the supplying region, and the narrow tube is formed such that a lower end portion of the narrow tube is disposed on the central axis of the supplying region and a direction in which the narrow tube extends is inclined with respect to an upward or downward direction.

6. The concentration equipment according to claim 5, further comprising:

a control unit configured to control ejection of the solvent from the container by the ejection unit; and a detection unit configured to detect a liquid surface of the solution in the container, wherein the control unit controls the ejection unit to stop ejecting the solvent from the container, when the detection unit detects that the liquid surface has fallen to a predetermined height in the container.

7. A concentration method for concentrating a solution using a container in which the solution is contained, the container including a supplying region in which a swirling flow of a gas is supplied to the solution, and an avoidance region that is situated below the supplying region and in which supplying of the swirling flow to the solution is avoided, wherein the supplying region is formed such that the swirling flow is supplied from an upper portion of the container for concentration, the avoidance region includes a narrow tube that is continuous with a lower end portion of the supplying region and that has a diameter smaller than a diameter of the supplying region, a position of an upper end opening of the narrow tube is offset from a central axis of the supplying region, and the narrow tube is formed such that a lower end portion of the narrow tube is disposed on the central axis of the supplying region and a direction in which the narrow tube extends is inclined with respect to an upward or downward direction, the concentration method comprising:

injecting the solution into the container up to a height that is within in the supplying region;

concentrating including supplying the swirling flow of the gas, which is introduced from outside the container into the container by ejecting the gas present inside the container, to the solution in the container, the concentrating also including ejecting a solvent, which is vaporized from the solution by effects of the swirling flow, from inside the container together with the gas;

stopping the ejecting of the gas in response to sensing that the solution is reduced to a predetermined quantity; and extracting the solution concentrated in the container from the container.

8. The concentration method according to claim 7, wherein the stopping of the ejecting of the gas in response to sensing that the solution is reduced to the predetermined quantity includes sensing depletion of the solution from the supplying region.

* * * * *